(12) United States Patent
Qin et al.

(10) Patent No.: US 12,027,987 B2
(45) Date of Patent: Jul. 2, 2024

(54) ELECTRONIC TRANSFORMER AND A MICROWAVE COOKING APPLIANCE

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Chengyong Qin, Foshan (CN); Qinghai Li, Foshan (CN); Nianzhong Zheng, Foshan (CN); Shinichi Masuda, Foshan (CN); Yunxiang Zhang, Foshan (CN); Junliang Ai, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 628 days.

(21) Appl. No.: 17/049,572

(22) PCT Filed: Jun. 14, 2018

(86) PCT No.: PCT/CN2018/091330
§ 371 (c)(1),
(2) Date: Oct. 22, 2020

(87) PCT Pub. No.: WO2019/205251
PCT Pub. Date: Oct. 31, 2019

(65) Prior Publication Data
US 2021/0242794 A1    Aug. 5, 2021

(30) Foreign Application Priority Data

Apr. 26, 2018 (CN) .......................... 201810386132.0
Apr. 26, 2018 (CN) .......................... 201820618071.0

(51) Int. Cl.
*H05B 6/66* (2006.01)
*H01F 27/32* (2006.01)
(Continued)

(52) U.S. Cl.
CPC ...... *H02M 3/33592* (2013.01); *H01F 27/325* (2013.01); *H05B 6/666* (2013.01); *H05B 6/683* (2013.01); *H05B 6/687* (2013.01)

(58) Field of Classification Search
CPC . H01F 27/325; H02M 1/0006; H02M 1/0009; H02M 1/007; H02M 3/28;
(Continued)

(56) References Cited

U.S. PATENT DOCUMENTS 4,777,575 A    10/1988 Yamato et al.
4,843,202 A     6/1989 Smith et al.
(Continued)

FOREIGN PATENT DOCUMENTS

CN    1255602 A    6/2000
CN    1279816 A    1/2001
(Continued)

OTHER PUBLICATIONS

Translation of JP 2002-359065A, "High Frequency Heater System", Dec. 13, 2002, by ProQuest (Year: 2002).*
(Continued)

*Primary Examiner* — Quang T Van

(57) ABSTRACT

An electronic transformer and a microwave cooking appliance. The electronic transformer includes a rectifier device, a transformer, a switch device, and a control device. The rectifier device is connected to an alternating current source; the transformer is connected to the rectifier device; the switch device is configured to provide an on/off signal to the transformer; the control device is connected to the switch device; the control device is configured to generate a control
(Continued)

signal according to preset power and provide the control signal to the switch device to control the switching frequency of the switch device.

15 Claims, 20 Drawing Sheets

(51) Int. Cl.
*H02M 3/335* (2006.01)
*H05B 6/68* (2006.01)

(58) Field of Classification Search
CPC ......... H02M 3/33507; H02M 3/33592; H02M 7/06; H05B 6/666; H05B 6/683; H05B 6/687
USPC ....... 219/715, 716, 717, 712, 702, 718, 721, 219/722, 723, 679; 363/17, 16, 20, 34, 363/53, 64, 66, 97, 307
See application file for complete search history.

(56) References Cited

U.S. PATENT DOCUMENTS

| | | | |
|---|---|---|---|
| 6,049,071 A | * | 4/2000 | Le Van Suu ............. H05B 6/68 236/78 D |
| 10,051,696 B2 | * | 8/2018 | Wu ................... H02M 3/33561 |
| 2002/0067630 A1 | | 6/2002 | Tokunaga et al. |
| 2013/0114308 A1 | | 5/2013 | Liao et al. |

FOREIGN PATENT DOCUMENTS

| | | | | |
|---|---|---|---|---|
| CN | 1282081 | A | | 1/2001 |
| CN | 1316173 | A | | 10/2001 |
| CN | 1389084 | A | | 1/2003 |
| CN | 1816226 | A | | 8/2006 |
| CN | 102916594 | A | | 2/2013 |
| CN | 104505217 | A | | 4/2015 |
| CN | 105575590 | A | | 5/2016 |
| CN | 106211408 | A | | 12/2016 |
| CN | 106993348 | A | | 7/2017 |
| CN | 107191980 | A | | 9/2017 |
| CN | 208094448 | U | | 11/2018 |
| EP | 0757364 | A2 | | 2/1997 |
| JP | S62225165 | A | | 10/1987 |
| JP | 63257463 | A | * | 10/1988 |
| JP | H0289840 | U | | 7/1990 |
| JP | H0571743 | A | | 3/1993 |
| JP | 2002359065 | A | | 12/2002 |
| JP | 2003086437 | A | | 3/2003 |
| JP | 2005223981 | A | | 8/2005 |
| JP | 2014236128 | A | * | 12/2014 |
| JP | 2018064010 | A | | 4/2018 |

OTHER PUBLICATIONS

Translation of JP2014-236128A, "Coil Device", Dec. 15, 2014, by ProQuest (Year: 014).*
OA mailed Oct. 6, 2022 for EP application 18916874.3.
International Search Report of PCT/CN2018/091330.
First OA for CN application 201810386132.0.
Second OA for CN application 201810386132.0.
Third OA for CN application 201810386132.0.
Fourth OA for CN application 201810386132.0.
OA for JP application 2020-559449.
OA received in EP application 23159802.0; mailed Oct. 9, 2023.
OA received in EP application 18916874.3; mailed Dec. 15, 2023.
Triac-Dimmable, Primary-Side-ControlOffline LED Controller with Active PFC.

* cited by examiner

ELECTRONIC TRANSFORMER AND A MICROWAVE COOKING APPLIANCE

CROSS-REFERENCES TO RELATED APPLICATIONS

The present disclosure is a national phase application of International Application No. PCT/CN2018/091330, which claims priority to and benefits of Chinese Patent Application Serial No. 201810386132.0 and No. 201820618071.1 filed with the National Intellectual Property Administration of P. R. China on Apr. 26, 2018, the entire content of which is incorporated herein by reference.

FIELD

The present disclosure relates to a field of household appliances, and more particularly to an electronic transformer and a microwave cooking appliance.

BACKGROUND

In microwave ovens of the related art, the magnetron is generally powered by increasing the voltage through a frequency converter, while the voltage of the alternating current (AC) source connected to the frequency converter is prone to fluctuate, such that the output power of the frequency converter is unstable, resulting in an abnormality when the frequency converter works, and the user experience is poor.

In addition, the existing frequency converter needs to be provided with a communication device to communicate with the controller of the microwave oven, and the power of the frequency converter needs to be continuously adjusted, such that the production cost of the frequency converter is high.

SUMMARY

Embodiments of the present disclosure provide an electronic transformer and a microwave cooking appliance.

The electronic transformer according to embodiments of the present disclosure includes:
- a rectifier device for connecting to an AC source;
- a transformer connected to the rectifier device;
- a switch device configured to provide an on/off signal to the transformer; and
- a control device connected to the switch device, and configured to generate a control signal according to a preset power to the switch device and control a switching frequency of the switch device based on the control signal.

In the electronic transformer of the above embodiments, since the switch device may provide the on/off signal to the transformer, it may play a role of protecting the circuit when the AC source is unstable. In addition, the control device may control the switching frequency of the switch device, such that the electronic transformer may stably provide an output voltage, and the manufacturing cost of the electronic transformer according to embodiments of the present disclosure is low.

Embodiments of the present disclosure also provide a microwave cooking appliance. The microwave cooking appliance includes the electronic transformer according to any of above embodiments of the present disclosure and a microwave generator. The electronic transformer is connected to the microwave generator.

In the microwave cooking appliance of the above embodiments, since the switch device is configured to provide the on/off signal to the transformer, it may play a role of protecting the circuit when the AC source is unstable. In addition, the control device may control the switching frequency of the switch device, such that the electronic transformer may stably provide an output voltage, and the manufacturing cost of the microwave cooking appliance according to embodiments of the present disclosure is low.

Additional embodiments of present disclosure will be given in part in the following descriptions, become apparent in part from the following descriptions, or be learned from the practice of embodiments of the present disclosure.

BRIEF DESCRIPTION OF THE DRAWINGS

Embodiments of the present disclosure will become apparent and more readily appreciated from the following descriptions made with reference to the drawings, in which.

Figures 1, 2:
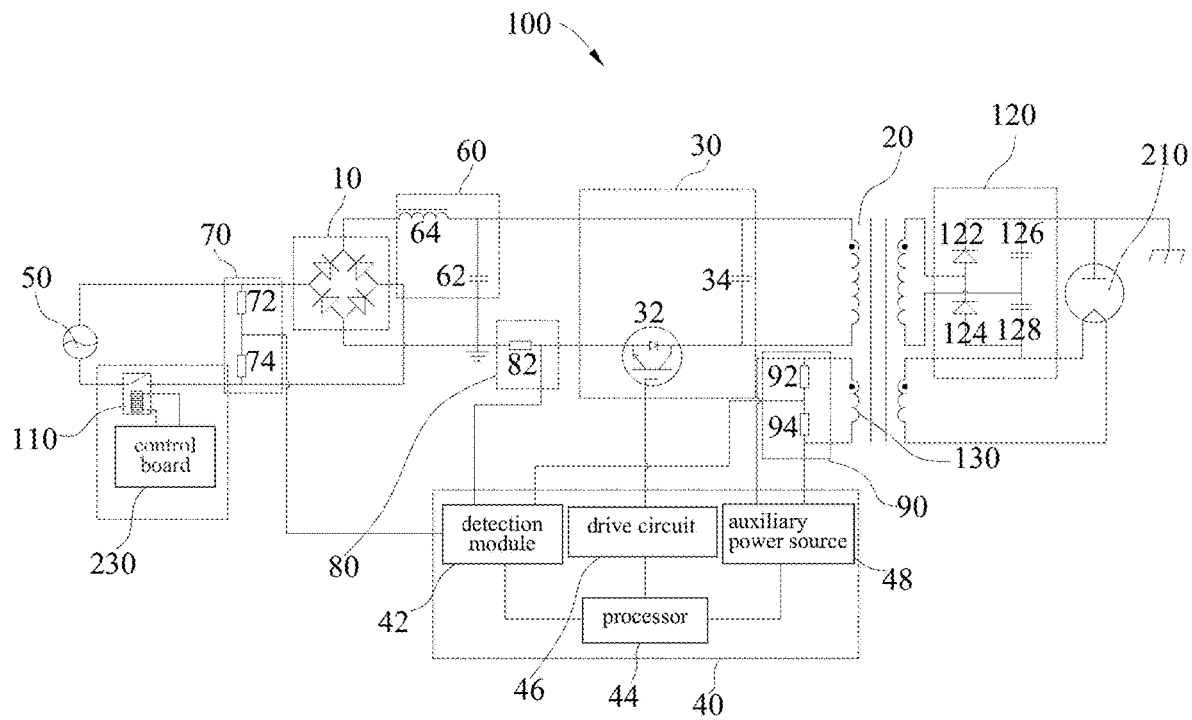
FIG. 1 is a schematic circuit diagram of an electronic transformer according to an embodiment of the present disclosure.
FIG. 2 is a schematic block diagram of a microwave cooking appliance according to an embodiment of the present disclosure.

REFERENCE NUMERALS microwave cooking appliance 200, electronic transformer 100, rectifier device 10, transformer 20, switch device 30, switching tube 32, resonant capacitor 34, control device 40, detection device 42, processor 44, drive circuit 46, auxiliary power source 48, AC source 50, filter device 60, filter capacitor 62, filter inductor 64, first sampling device 70, first resistor 72, second resistor 74, second sampling device 80, third resistor 82, third sampling device 90, fourth resistor 92, fifth resistor 94, switching element 110, voltage doubler rectifying device 120, first voltage doubler diode 122, second voltage doubler diode 124, first voltage doubler capacitor 126, second voltage doubler capacitor 128, auxiliary transformer 130, microwave generator 210, upper computer 220, control board 230.

DETAILED DESCRIPTION OF THE DISCLOSURE

Embodiments of the present disclosure will be described in detail below, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure, and shall not be construed to limit the present disclosure.

In the description of the present disclosure, it should be understood that, the terms such as "first" and "second" are used herein for purposes of description and are not intended to indicate or imply relative importance or significance or to imply the number of indicated features. Thus, the feature defined with "first" and "second" may comprise one or more of this feature. In the description of the present disclosure, "a plurality of" means two or more than two, unless specified otherwise.

In the description of the present disclosure, it should be understood that, unless specified or limited otherwise, the terms "mounted," "connected," and "coupled" and the like are used broadly, and may be, for example, fixed connections, detachable connections, or integral connections; may also be mechanical or electrical connections; may also be direct connections or indirect connections via intervening structures; may also be inner communications or interactions of two elements.

Various embodiments and examples are provided in the following description to implement different structures of the present disclosure. In order to simplify the present disclosure, elements and settings will be described below. However, these elements and settings are only by way of example and are not intended to limit the present disclosure. In addition, reference numerals and/or reference letters may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated that other processes and/or materials may be also applied.

Referring to FIG. 1, an electronic transformer 100 provided according to embodiments of the present disclosure includes a rectifier device 10, a transformer 20, a switch device 30 and a control device 40. The rectifier device 10 is configured for connecting to an AC source 50. The transformer 20 is connected to the rectifier device 10. The switch device 30 is configured to provide an on/off signal to the transformer 20. The control device 40 is connected to the switch device 30. The control device 40 is configured to generate a control signal according to a preset power to the switch device 30 and control a switching frequency of the switch device 30 based on the control signal.

In the electronic transformer 100 of the above embodiments, since the switch device 30 provides the on/off signal to the transformer 20, it may play a role of protecting the circuit when the AC source 50 is unstable. In addition, the control device 40 controls the switching frequency of the switch device 30, such that the electronic transformer 100 may stably provide an output voltage, and the manufacturing cost of the electronic transformer 100 according to embodiments of the present disclosure is low.

In one embodiment, the rectifier device 10 includes a full-wave rectifying circuit composed of four diodes. The rectifier device 10 may convert an AC voltage generated by the AC source 50 into a direct current (DC) voltage. It should be noted that, in an example, the AC voltage generated by the AC source 50 is approximately 220 V, and the frequency is approximately 50 Hz. It should be understood that the rectifier device 10 may adopt other forms of circuits and is not limited to the one composed of four diodes.

Further, the electronic transformer 100 further includes a filter device 60, and the filter device 60 is connected to the rectifier device 10 and the transformer 20. The filter device 60 includes a filter capacitor 62 and a filter inductor 64. A terminal of the filter capacitor 62 is connected to a ground terminal. The filter capacitor 62 and the filter inductor 64 may improve the anti-interference ability of the electronic transformer 100, and may also reduce the interference of the electronic transformer 100 to other devices.

It should be noted that in this embodiment, the transformer 20 may be a high frequency transformer 20. The high frequency transformer 20 is a power transformer 20 with an operating frequency greater than the intermediate frequency (10 kHz). The high frequency transformer 20 includes a primary coil (for example, the primary winding 510 in the example of FIG. 3, the primary winding 6141 in the example of FIG. 9 and the primary winding 7141 in the example of FIG. 16) and a secondary coil (for example, the secondary winding 520 in the example of FIG. 3, the secondary winding 6143 in the example of FIG. 9 and the secondary winding 7143 in the example of FIG. 16). The high frequency transformer 20 transmits a high frequency pulse square wave signal. The control signal generated by the control device 40 may be a high frequency signal, for example, a signal greater than 10 kHz.

The switch device 30 includes a switching tube 32 and a resonant capacitor 34. A base of the switching tube 32 is connected to the control device 40, a collector of the switching tube 32 is connected to one end of the primary coil of the transformer 20 and one end of the resonant capacitor 34, an emitter of the switching tube 32 is connected to the rectifier device 10, and the other end of the resonant capacitor 34 is connected to the other end of the primary coil of the transformer 20 and the rectifier device 10. The DC voltage output by the rectifier device 10 is converted into a high frequency AC voltage of 20 KHz to 50 KHz through the action of the switching tube 32, the resonant capacitor 34 and the transformer 20. When the switching tube 32 is turned on, the electrical energy may be stored in the primary coil of the transformer 20 through the resonant capacitor 34 to maintain the voltage of the transformer 20. When the switching tube 32 is turned off, the transformer 20 and the resonant capacitor 34 resonate with each other, so that the voltage of the collector of the switching tube 32 starts from 0 V when the switching tube 32 is turned on next time, reducing the switching loss of the switching tube 32.

It should be pointed out that the switching tube 32 may be an insulated gate bipolar transistor (IGBT), and the drive circuit 46 drives the IGBT to turn on or off.

In some embodiments, the on/off signal is synchronized with the switching frequency of the switch device 30. For example, when the switch device 30 is switched on (turned on), the switch device 30 provides a turn-on signal to the transformer to make the transformer operate; when the switch device 30 is switched off (turned off), the switch device 30 provides an interrupt signal to the transformer 20 to stop the transformer 20 from operating.

The preset power of the electronic transformer 100 may be a power set in advance, when the voltage of the AC source 50 fluctuates, the control device 40 may generate a control signal to the switch device 30 to control the turn-on time of the switching tube 32. The longer the turn-on time of the switching tube 32 is, the lower the switching frequency of the switching tube 32 is, such that the smaller the output current of the emitter of the switching tube 32 is. That is, in the case that the control device 40 operates at the preset power, when the voltage of the AC source 50 fluctuates and rises, the control device 40 may control the switching frequency of the switch device 30 according to the preset power to control the output current of the emitter of the switching tube 32, such that the electronic transformer 100 maintains a constant output power per unit time to reach the preset power of the electronic transformer 100.

In embodiments of the present disclosure, the electronic transformer 100 is different from an ordinary transformer. The electronic transformer 100 is able to stabilize its own output power according to the detected environmental variables (such as the voltage fluctuation of the AC source, etc.) and the preset power without a controlling signal of an external control device.

It should be understood that, in some embodiments, the electronic transformer 100 does not need to communicate with a microwave cooking appliance 200. Therefore, as compared with the prior art, there is no need to provide a communication device, reducing the manufacturing cost of the electronic transformer 100.

It should be noted that the electronic transformer 100 according to embodiments of the present disclosure does not need to continuously adjust its work in a wide range, and the power input to the electronic transformer 100 is only the maximum power and zero power input by a user. That is, as compared with the existing frequency converter, the electronic transformer 100 according to embodiments of the present disclosure can reduce the production cost for adjusting the power.

In some embodiments, the control device 40 includes a detection device 42 and a processor 44, the detection device 42 is configured to obtain a detection signal based on the detection to the AC source 50 and send the detection signal to the processor 44, and the processor 44 is configured to control the switching frequency of the switch device 30 based on the detection signal.

In this way, the voltage of the AC source 50 is detected by the detection device 42, and the switching frequency of the switch device 30 is controlled in time, such that the electronic transformer 100 may maintain a stable output power per unit time.

In one embodiment, the processor 44 may be a microcontroller unit (MCU). The processor 44 may process and analyze the detection signal collected by the detection device 42. When the detection device 42 detects that the voltage of the AC source 50 fluctuates, the processor 44 will perform corresponding processing to control the switching frequency of the switch device 30.

In some embodiments, the control device 40 includes a drive circuit 46, the drive circuit 46 is connected to the switch device 30 and the processor 44, respectively, and configured to control the switching frequency of the switch device 30 according to the control signal output by the processor 44.

In this way, the control signal output by the processor 44 may pass through the drive circuit 46 to control the switching frequency of the switch device 30, which makes the circuit structure simple.

In one embodiment, the processor 44 may generate a corresponding pulse width modulation (PWM) signal according to the detection signal detected by the detection device 42, and the drive circuit 46 may receive the pulse width modulation signal sent from the processor 44 to control the turn-on time of the switching tube 32, changing the switching frequency of the switching tube 32. It should be noted that, in an example, the pulse width modulation signal is a pulse with the same pulse width. The output frequency may be adjusted by changing the period of a pulse train, and the output voltage may be adjusted by changing the width or duty cycle of the pulse. That is, the changes of the voltage and frequency may be coordinated by adopting an appropriate control method, such that the purpose of controlling the current of the electronic transformer 100 may be achieved by adjusting the period or the duty cycle of the PWM.

In some embodiments, the electronic transformer 100 includes a first sampling device 70, the first sampling device 70 is connected to an output terminal of the AC source 50 and the detection device 42, respectively, and the detection device 42 is configured to collect the detection signal through the first sampling device 70.

In this way, the operating state of the AC source 50 may be accurately obtained by the first sampling device 70, such that the detection device 42 may obtain the operating state of the electronic transformer 100 more accurately.

In one embodiment, the first sampling device 70 includes a first resistor 72 and a second resistor 74. One end of the first resistor 72 is connected to the AC source 50 and the rectifier device 10, and the other end of the first resistor 72 is connected to the second resistor 74 and the detection device 42. One end of the second resistor 74 is connected to the AC source 50 and the rectifier device 10, and the other end of the second resistor 74 is connected to the first resistor 72 and the detection device 42. In this way, the detection device 42 may detect the voltage of the AC source 50 through the first resistor 72 and the second resistor 74.

In some embodiments, the electronic transformer 100 includes a second sampling device 80, the second sampling device 80 is connected to an output terminal of the rectifier device 10 and the detection device 42, respectively, the detection device 42 is configured to detect a current of the transformer 20 through the second sampling device 80, and the processor 40 is configured to control the switching frequency of the switch device 30 according to the current of the transformer 20, the voltage of the AC source 50, and the preset power.

In this way, the current of the transformer 20 may be quickly and accurately detected by the second sampling device 80, and the circuit structure is simple.

In one embodiment, the second sampling device 80 includes a third resistor 82, one end of the third resistor 82 is connected to the output terminal of the rectifier device 10 and a ground terminal, and the other end of the third resistor 82 is connected to the emitter of the switching tube 32 and the detection device 42. The detection device 42 may detect the current of the transformer 20 by detecting the current flowing through the third resistor 82. The processor 44 may adjust the turn-on time of the switching tube 32 according to the current of the transformer 20 and the voltage of the AC source 50 detected by the detection device 42 as well as the preset power of the control device 40, to adjust the current of the transformer 20 when the voltage of the AC source 50 fluctuates, such that the preset power is controlled to maintain unchanged, and thus the output power of the transformer 20 in a unit time is maintained stable.

In some embodiments, the electronic transformer 100 includes an auxiliary transformer 130 connected to the control device 40, the auxiliary transformer 130 is configured to detect a primary voltage of the transformer 20, and the control device 40 is configured to turn off the switch device 30 when the primary voltage of the transformer 20 is greater than a set voltage.

In this way, the primary voltage of the transformer 20 may be quickly detected by the auxiliary transformer 130 and fed back to the control device 40 quickly, and the circuit structure is simple.

In one embodiment, in embodiments of the present application, the control device 40 includes a detection device 42 and a processor 44, and a voltage of the auxiliary transformer 130 is proportional to (such as directly proportional to) the primary voltage of the transformer 20. This is, the detection device 42 detects the voltage of the auxiliary transformer 130, and transmits the voltage of the auxiliary transformer 130 to the processor 44, and the processor 44 may obtain the primary voltage of the transformer 20 according to the proportional relationship between the voltage of the auxiliary transformer 130 and the primary voltage of the transformer 20. At the same time, when the primary voltage of the transformer 20 is greater than the set voltage, the processor 44 may control the switching tube 32 of the switch device 30 to turn off after performing corresponding processing and analysis, to protect the transformer 20 and the switching tube 32.

Further, the case where the auxiliary transformer 130 is connected to a primary side of the transformer 20 is able to stabilize the output of the transformer 20, and compared with the winding coils and insulating materials required for the case where the auxiliary transformer 130 is connected to a secondary side of the transformer 20, the auxiliary transformer 130 connected to the primary side of the transformer 20 may reduce the cost of the transformer 20 and the size of the transformer 20.

In some embodiments, the electronic transformer 100 includes a third sampling device 90, the third sampling device 90 is connected to the auxiliary transformer 130 and the control device 40, respectively, and the control device 40 is configured to detect the primary voltage of the transformer 20 through the third sampling device 90.

In this way, through the third sampling device 90, the primary voltage of the transformer 20 may be quickly and accurately detected, and the circuit structure is simple.

In one embodiment, in embodiments of the present application, the control device 40 includes a detection device 42 and a processor 44, and the third sampling device 90 includes a fourth resistor 92 and a fifth resistor 94. One end of the fourth resistor 92 is connected to one end of the auxiliary transformer 130 and the processor 44, respectively, and the other end of the fourth resistor 92 is connected to the detection device 42. One end of the fifth resistor 94 is connected to one end of the auxiliary transformer 130 and the processor 44, respectively, and the other end of the fifth resistor 94 is connected to the detection device 42. The detection device 42 may quickly detect the voltage of the auxiliary transformer 130 through the fourth resistor 92 and the fifth resistor 94.

In some embodiments, the control device 40 includes an auxiliary power source 48, and the auxiliary power source 48 is connected to the auxiliary transformer 130. In this way, the auxiliary power source 48 may provide power to the control device 40 through the auxiliary transformer 130.

In one embodiment, the processor 44 is respectively connected to the one end of the fourth resistor 92 and the one end of the fifth resistor 94 through the auxiliary power source 48. At the same time, the auxiliary power source 48 is connected to the processor 44, and may continuously provide power to the processor 44 or other devices, circuits or elements of the control device 40.

In some embodiments, the auxiliary power source 48 may include a voltage stabilizer, a rectifier diode, a capacitor, etc. The rectifier diode converts an output voltage of the auxiliary transformer 130 into a DC voltage to charge the capacitor. A voltage of the capacitor is stabilized by the voltage stabilizer at a value, such as 18 V and/or 5 V, and a voltage output by the voltage stabilizer may be provided to the processor 44 and the drive circuit 46, for example, 5 V is provided to the processor 44, and 18 V is provided to the drive circuit 46.

In some embodiments, the electronic transformer 100 includes a switching element 110 connected to the AC source 50 and the rectifier device 10, respectively, and the control device 40 is configured to control an on/off time of the switching element 110 to adjust an output power of the transformer 20 per unit time.

In this way, by controlling the on/off time of the switching element 110 to adjust the output power of the transformer 20 per unit time, the efficiency is high, the output power of the transformer 20 per unit time is maintained stable, and the circuit structure is simple.

In one embodiment, in an example, the switching element 110 is a relay, an electromagnetic relay. The electromagnetic relay is generally composed of an iron core, a coil, an armature and a contact reed, etc. When a voltage is applied to two ends of the coil, a current will flow through the coil, which will produce the electromagnetic effect, and under the action of electromagnetic attraction, the armature will overcome the pulling force to the spring and be attracted to the core, driving a movable contact of the armature to attach to a fixed contact (normally open contact), and the relay is closed. When the coil is powered off, the electromagnetic attraction will disappear, such that the armature will return to its original position under the reaction force of the spring, the movable contact will detach from the original fixed contact (normally closed contact), and the relay will be disconnected. Through such attachment and detachment, the circuit may be connected or disconnected. In embodiments of the present application, the output power of the transformer 20 per unit time may be controlled by controlling the on/off time of the relay. That is, an on/off time ratio in a unit time of the relay 110 may be controlled according to the power input by a user, to enable the transformer 20 to output a power as that set by the user.

It should be noted that the power input or set by the user may be the same as or different from the preset power of the electronic transformer 100, and the "user" used herein refers to an ordinary consumer rather than a professional maintenance person. The power input or set by the user refers to a power that the user may input or set through a key or an input interface on the electrical appliance, while the preset power of the electronic transformer 100 is a power that does not change with the input or settings of the user, which may be a fixed power set when the electrical appliance or electronic transformer 100 leaves the factory. It should be understood that when the electrical appliance or the electronic transformer 100 is repaired, the maintenance person may change the preset power of the electronic transformer 100 by a maintenance instrument, but the user generally cannot change the preset power of the electronic transformer 100 when normally using the electrical appliance.

In an example, the preset power of the electronic transformer 100 is 1000 W, and the power input by the user is 800 W. In embodiments of the present application, the preset power of the electronic transformer 100 does not change with the power input by the user. That is, the electronic transformer 100 will control the switching element 110 according to the preset power of 1000 W. However, in order to reach the power of 800 W set by the user, the output power of the electronic transformer 100 can only be controlled by controlling the on/off time of the switching element 110 through the electronic transformer 100. When the switching element 110 is turned on, the output power of the electronic transformer 100 is 1000 W, while when the switching element 110 is turned off, the output power of the electronic transformer 100 is 0 W. For example, within a unit time (such as 10 s), the switching element 110 is controlled to turn on for 8 s and turn off for 2 s, then an average output power of the electronic transformer 100 within the unit time (10 s) is 800 W. That is, the output power of the electronic transformer 100 within the unit time may be equal to the power input or set by the user.

In some embodiments, the switching element 110 is configured to control the on/off time of the switching element 110 by an upper computer 220 of a microwave cooking appliance 200 where the electronic transformer 100 is applied.

In one embodiment, in an example, the preset power of the electronic transformer 100 is 1000 W, and the power input by the user is 800 W. The preset power of the electronic transformer 100 does not change with the power input by the user. In order to reach the power of 800 W set by the user, the upper computer 220 of the microwave cooking appliance 200 controls the on/off time of the switching element 110 to control the output power of the electronic transformer 100. For example, within a unit time (such as 10 s), the upper computer 220 of the microwave cooking appliance 200 controls the switching element 110 to turn on for 8 s and turn off for 2 s, then the average output power of the electronic transformer 100 within a unit time (such as 10 s) is 800 W. That is, the output power of the electronic transformer 100 within the unit time may be equal to the power input or set by the user.

It should be noted that the output power of the electronic transformer may be understood to be consistent with the power input by user's operation, while the preset power of the electronic transformer 100 is a power preset by the control device of the electronic transformer.

In some embodiments, the electronic transformer 100 includes a voltage doubler rectifying device 120, which is connected to the secondary side of the transformer 20 and configured to increase an output voltage of the transformer.

In this way, the output voltage of the transformer 20 may be doubled by the voltage doubler rectifying device 120, and the circuit structure is simple.

In one embodiment, the voltage doubler rectifying device 120 includes a first voltage doubler diode 122, a second voltage doubler diode 124, a first voltage doubler capacitor 126, and a second voltage doubler capacitor 128. The first voltage doubler diode 122 and the second voltage doubler diode 124 are connected in series. The first voltage doubler capacitor 126 and the second voltage doubler capacitor 128 are connected in series. A circuit consist of the first voltage doubler diode 122 and the second voltage doubler diode 124 is connected in parallel with a circuit consist of the first voltage doubler capacitor 126 and the second voltage doubler capacitor 128. One end of one secondary coil of the transformer 20 is connected between the first voltage doubler diode 122 and the second voltage doubler diode 124, and the other end of the one secondary coil of the transformer 20 is connected between the first voltage doubler capacitor 126 and the second voltage doubler capacitor 128. In addition, another secondary coil of the transformer 20 may be connected to an electric load, such as a microwave generator 210.

Figure 3:
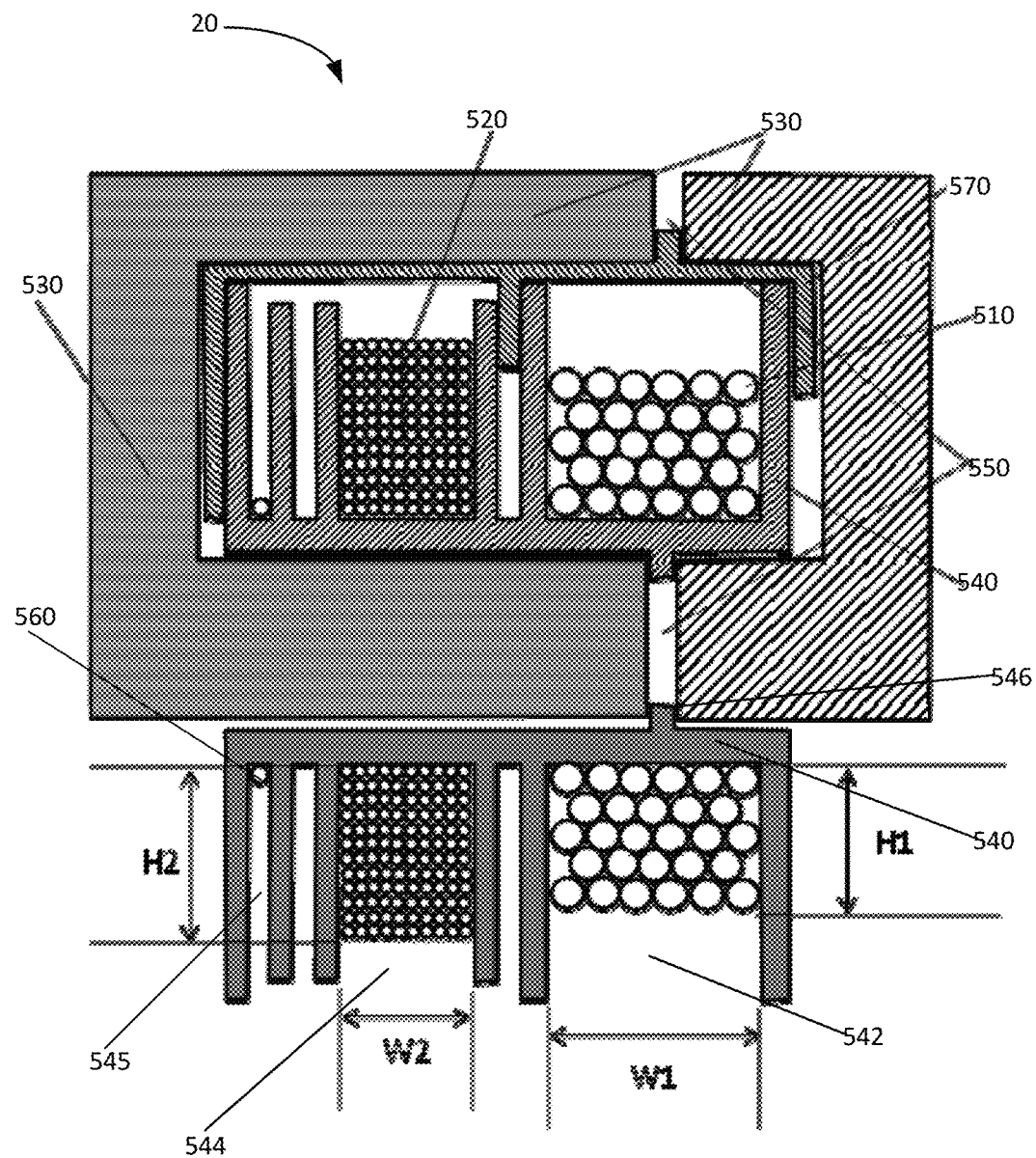
FIG. 3 is a schematic sectional view of a transformer according to an embodiment of the present disclosure.

In some embodiments, referring to FIG. 3, the transformer 20 includes a primary winding 510 and a secondary winding 520. The secondary winding 520 is spaced apart from the primary winding 510. A winding width W1 of the primary winding 510 is greater than a stack height H1 of the primary winding 510, i.e., W1>H1. A winding width W2 of the secondary winding 520 is smaller than a stack height H2 of the secondary winding 520, i.e., W2<H2. The switch device 30 is connected to the primary winding 510.

In the transformer 20 according to above embodiments, since the winding width W1 of the primary winding 510 is greater than the stack height H1 of the primary winding 510, and the winding width W2 of the secondary winding 520 is smaller than the stack height H1 of the primary winding 510, the transformer 20 may maintain an appropriate coupling ratio, and at the same time, the structure of the transformer 20 is simplified and miniaturized. In addition, the transformer 20 according to embodiments of the present disclosure neither needs to be designed with a skip groove, nor requires an excessively high magnetic gap accuracy.

In one embodiment, the transformer 20 includes two oppositely inserted magnetic cores 530. On the one hand, a magnetic gap width between the two magnetic cores 530 affects the coupling ratio of the transformer 20; on the other hand, the winding width and winding height of the transformer 20 easily affect the coupling ratio of the transformer 20. During the use of the transformer 20, the coupling ratio is stabilized between 0.5 and 1.2.

Figure 4:
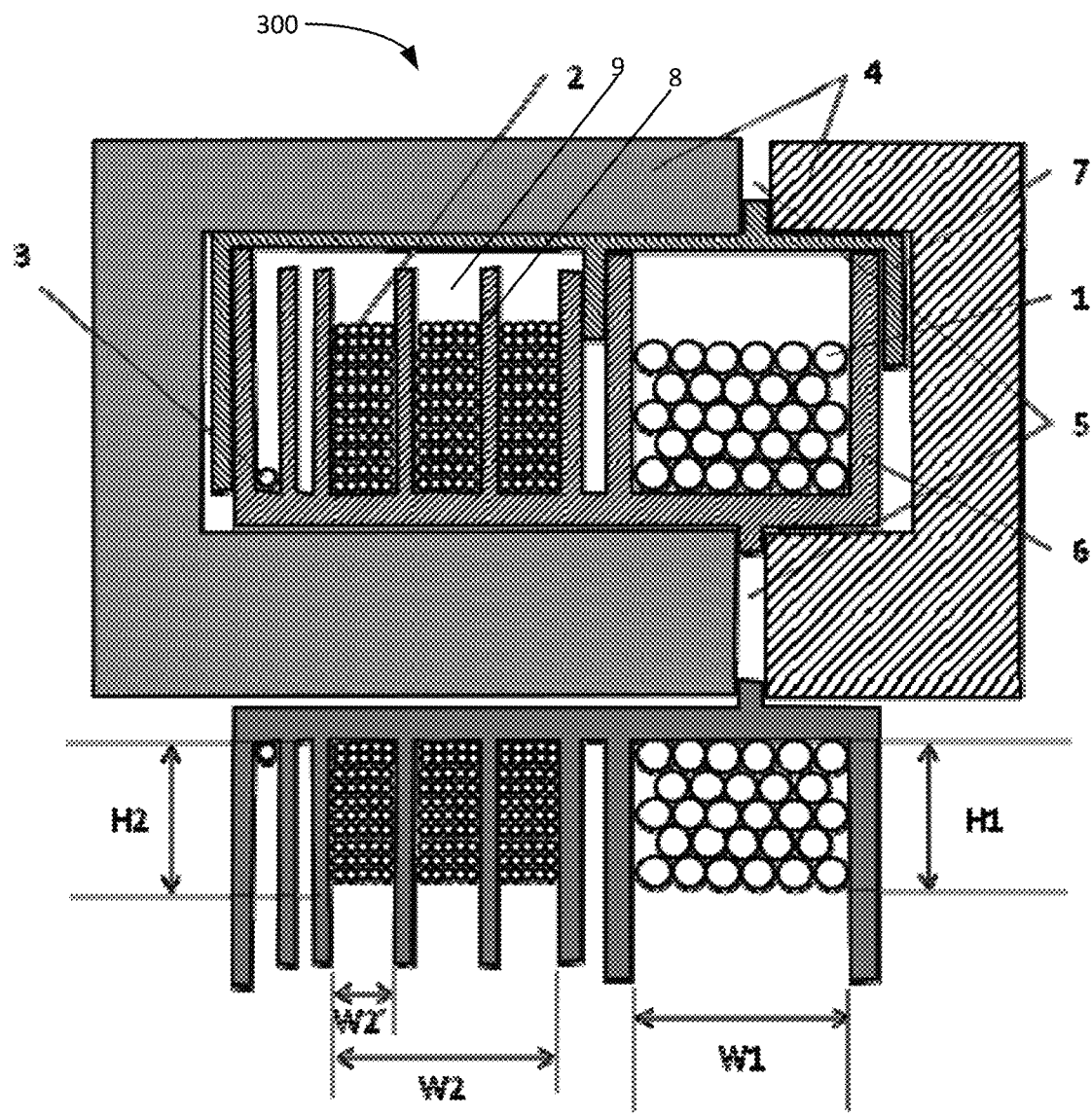
FIG. 4 is a schematic sectional view of a transformer in the related art.

In a related technique, referring to FIG. 4, a transformer 300 is composed of a primary winding 1, a secondary winding 2 and a heater winding 3. A magnetic gap 5 is set between two magnetic cores 4. The primary winding 1, the secondary winding 2 and the heater winding 3 are arranged in a width direction (i.e., a left-right direction shown in FIG. 4) of the transformer 300. A relationship between a lateral width (W1) and a stack height (H1) of the primary winding 1 is W1>H1. A relationship between a lateral width (W2) and a stack height (H2) of the secondary winding 2 is W2>H2. In the example of FIG. 4, since a cross-sectional area of the lateral width (W2) of the secondary winding 2 is large, the winding is complicated during production. In order to ensure the winding effect, it is often necessary to set multiple winding grooves 9, and when the winding is completed in one winding groove 9, it is necessary to skip to another winding groove 9 to continue the winding. In this way, on the one hand, the difficulty of setting the skeleton of the transformer 300 is increased; and on the other hand, in mass production, a lot of time will be taken when wire winding is skipped from one winding groove to another, which affects the production efficiency of the transformer 300. In addition, if not provide multiple winding grooves 9, based on the current production technology, winding dislocation is likely to occur during winding, causing a corona effect, which affects the stability of the transformer 300.

Figure 5:
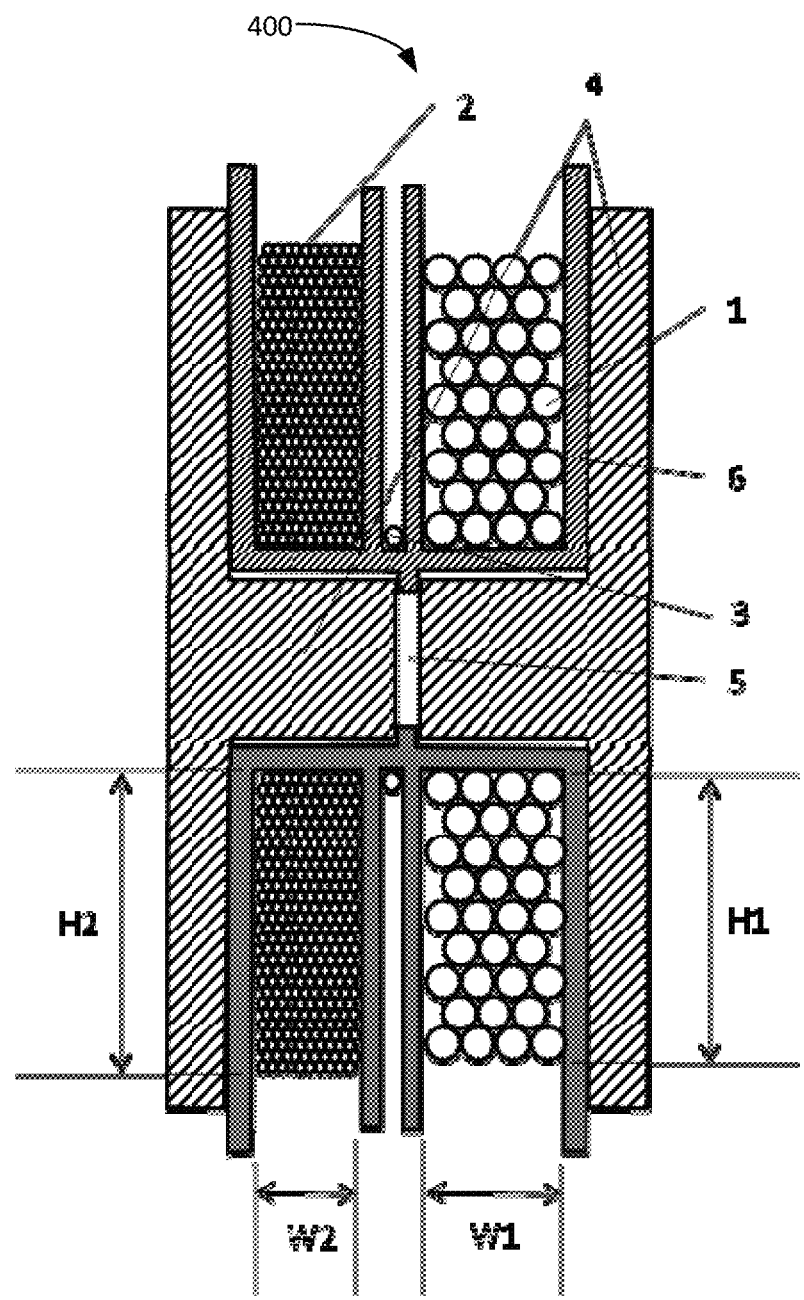
FIG. 5 is another schematic sectional view of a transformer in the related art.

In another related technique, referring to FIG. 5, a transformer 400 is composed of a primary winding 1, a secondary winding 2 and a heater winding 3. A magnetic gap 5 is set between two magnetic cores 4. The primary winding 1, the secondary winding 2 and the heater winding 3 are arranged in a width direction (i.e., a left-right direction shown in FIG. 5) of the transformer 300. A relationship between a lateral width (W1) and a stack height (H1) of the primary winding 1 is H1>W1. A relationship between a lateral width (W2) and a stack height (H2) of the secondary winding 2 is H2>W2. In the example of FIG. 5, although cross-sectional areas of the primary winding 1 and the secondary winding 2 are small and accordingly there is no need to set multiple grooves, and the winding error will not occur, the magnetic gap 5 needs to be adjusted in direct proportion when the lateral width (W1) of the primary winding 1 and the lateral width (W2) of the secondary winding 2 are both reduced, so the requirement to the accuracy of the magnetic gap 5 is extremely high. Therefore, in the transformer shown in FIG. 5, the magnetic gap 5 is located at a middle position between the primary winding 1 and the secondary winding 2, where a higher matching efficiency is achieved, and at the same time, the adjustment accuracy of the magnetic gap 5 is reduced. However, such a structure has the difficulty of standardizing production accuracy.

Figure 6:
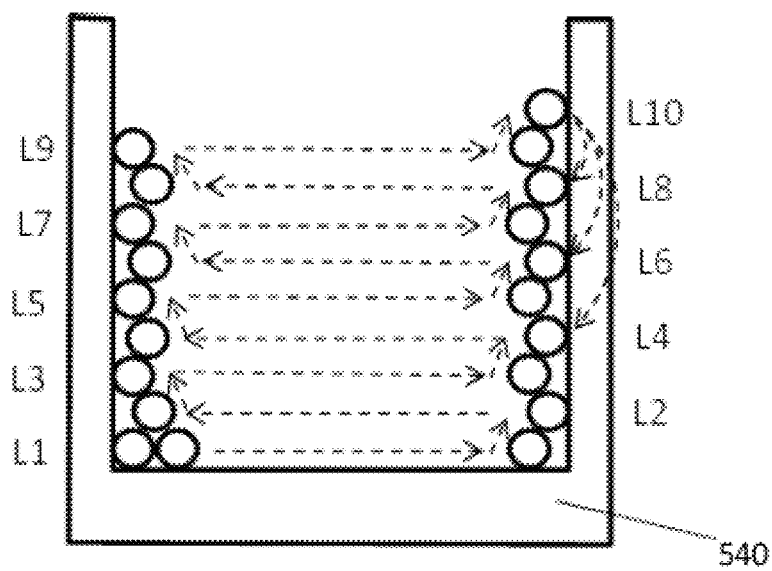
FIG. 6 is a schematic diagram of a winding structure of a transformer according to an embodiment of the present disclosure.

In addition, in the transformer shown in FIG. 5, since the stack height H1 of the primary winding 1 is relatively high, and H1>W1, a voltage difference between the lowest winding layer and the highest winding layer of the primary winding 1 is large, which will easily lead to dielectric breakdown of the primary winding, reducing the service life of the transformer. However, in the transformer 20 according to embodiments of the present application, since H1<W1, H1 is smaller, and dielectric breakdown is not easy to occur. In one embodiment, referring to FIG. 6, in an embodiment, a voltage of the lowest winding layer L1 of a winding group is 0, and as the number of layers increases, for example, from L1→L2→L3→L4→L5→L6→L7→L8→L9→L10, the voltage of the winding layer gradually increases. Since H1 is smaller, a voltage difference between the winding layer L1 and the highest winding layer L10 is smaller, so the dielectric breakdown is not easy to occur between the winding layers, which is beneficial to improve the service life of the transformer 20.

In addition, in this embodiment, referring to FIG. 3, the magnetic gap 550 is biased toward the primary winding 510, such that it is easy to adjust the coupling ratio of the transformer 20, and the coupling ratio of the transformer 20 may be stabilized at about 0.5 to about 1.2, which enable the transformer 20 to meet the performance requirements, and the requirements for the accuracy of the magnetic gap is relatively low. Further, such a structure conforms to the current specification for the production accuracy, and reduces the production difficulty and cost.

Furthermore, in this embodiment, the winding width W2 of the secondary winding 520 is smaller than the stack height H2 of the secondary winding 520, such that in the structural design of the transformer 20, the cross-sectional area of the secondary winding 520 is relatively small, and since it is unnecessary for the secondary winding to skip during winding, the structure of the transformer is simplified and miniaturized, and the production difficulty may be reduced and the production efficiency may be improved at the same time.

Further, referring to FIG. 3, in some embodiments, the transformer 20 includes an insulating bobbin 540. The bobbin 540 is provided with a single primary winding groove 542 and a single secondary winding groove 544 spaced apart from each other. A coil of the primary winding 510 is wound in the primary winding groove 542, and a coil of the secondary winding 520 is wound in the secondary winding groove 544.

In this way, it is unnecessary for the windings of the transformer 20 according to embodiments of the present disclosure to skip during winding, so that the production difficulty of the transformer 20 may be reduced and the production efficiency may be improved.

In one embodiment, relative to FIG. 4, the bobbin 540 according to embodiments of the present disclosure is just provided with a single secondary winding groove 544, and the winding width W2 of the secondary winding 520 wound on the secondary winding groove 544 is smaller than the stack height H2 of the secondary winding 520, such that the voltage difference between the winding layers of the secondary winding 520 may be maintained within a suitable range, and at the same time, the structure of the transformer 20 may be simplified and miniaturized. In addition, there is no need to skip wires during winding, which reduces the production difficulty and improves the production efficiency. It should be noted that although the transformer 20 according to embodiments of the present disclosure only has a single secondary winding groove 544 in the secondary winding, this design may overcome difficulties in the production process, such that the transformer 20 according to embodiments of the present disclosure can still meet the process requirements and performance requirements.

In some embodiments, the stack height H2 and the winding width W2 of the secondary winding 520 satisfy a following formula:

$$1.1 < H2/W2 < 2.5,$$

where H2 represents the stack height of the secondary winding 520, and W2 represents the winding width of the secondary winding 520.

In this way, the secondary winding 520 may meet the performance requirements of the transformer 20.

It should be understood that since the stack height H2 and the winding width W2 of the secondary winding 520 satisfy the following relationship: $1.1 < H2/W2 < 2.5$, the voltage difference between the various winding layers of the secondary winding 520 may be maintained in an appropriate range. In one embodiment, the stack height H2 of the secondary winding 520 may be 1.2 to 2 times the winding width W2 of the secondary winding 520. It should be noted that in actual production, a specific numerical value or numerical range may be obtained according to a magnetic gap accuracy of a production line. In the case of keeping the ratio of H2 to W2 between 1.1 and 2.5, if W2 needs to be designed as relatively small, the magnetic gap 550 may be designed to be relatively small, but the requirement for the accuracy of the magnetic gap 550 is relatively high. Similarly, in the case of keeping the ratio of H2 to W2 between 1.1 and 2.5, if W2 needs to be designed as relatively large, the magnetic gap 550 may be designed to be relatively large, but the requirement for the accuracy of the magnetic gap 550 is relatively low. Referring to FIG. 3, in some embodiments, the transformer 20 includes two oppositely inserted magnetic cores 530, the bobbin 540 includes a spacer element 546, and first ends of the two magnetic cores 530 are located in the bobbin 540 and abut against two opposite sides of the spacer element 546, respectively.

In this way, providing the spacer element 546 enables the two oppositely inserted magnetic cores 530 to meet the magnetic gap 550, such that the coupling ratio of the transformer 20 may be maintained in a proper range.

In one embodiment, the two oppositely inserted magnetic cores 530 abut against two opposite sides of the spacer element 546, respectively, such that the magnetic gap 550 may be formed between the two magnetic cores 530, making the magnetic gap of the transformer 20 meet usage requirements. It should be noted that the number of the spacer element 546 may be two, one spacer element 546 is configured to separate first ends of the two magnetic cores 530, and the other spacer element 546 is configured to separate second ends of the two magnetic cores 530.

In some embodiments, the transformer 20 includes a filament winding 560, the bobbin 540 is provided with a filament winding groove 545, the secondary winding groove 544 is located between the filament winding groove 545 and the primary winding groove 542, and a coil of the filament winding 560 is wound in the filament winding groove 545. In this way, an external microwave generator may be connected through the filament winding 560, so that the microwave generator may be powered.

Figure 7:
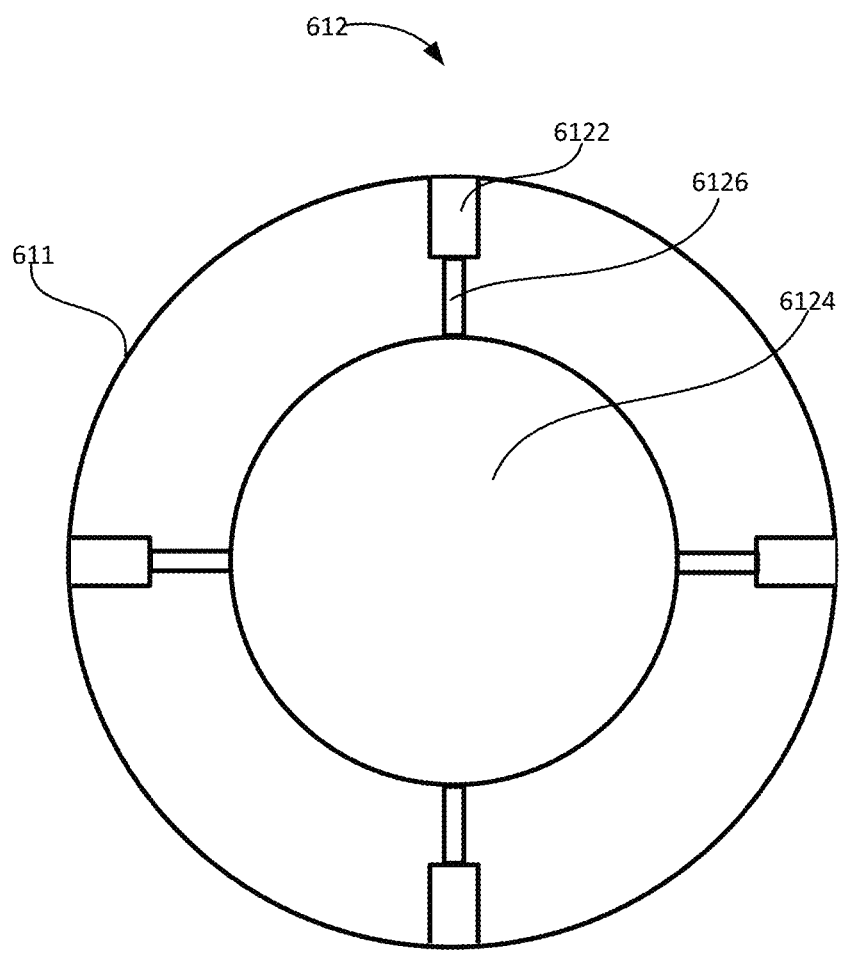
FIG. 7 is a schematic structure diagram of a first spacer element according to an embodiment of the present disclosure.
Figure 8:
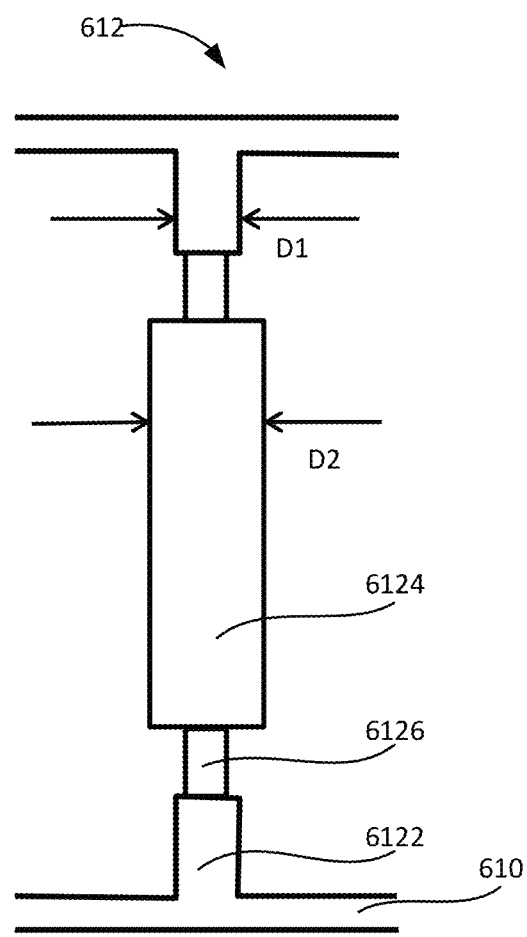
FIG. 8 is another schematic structure diagram of a first spacer element according to an embodiment of the present disclosure.
Figure 9:
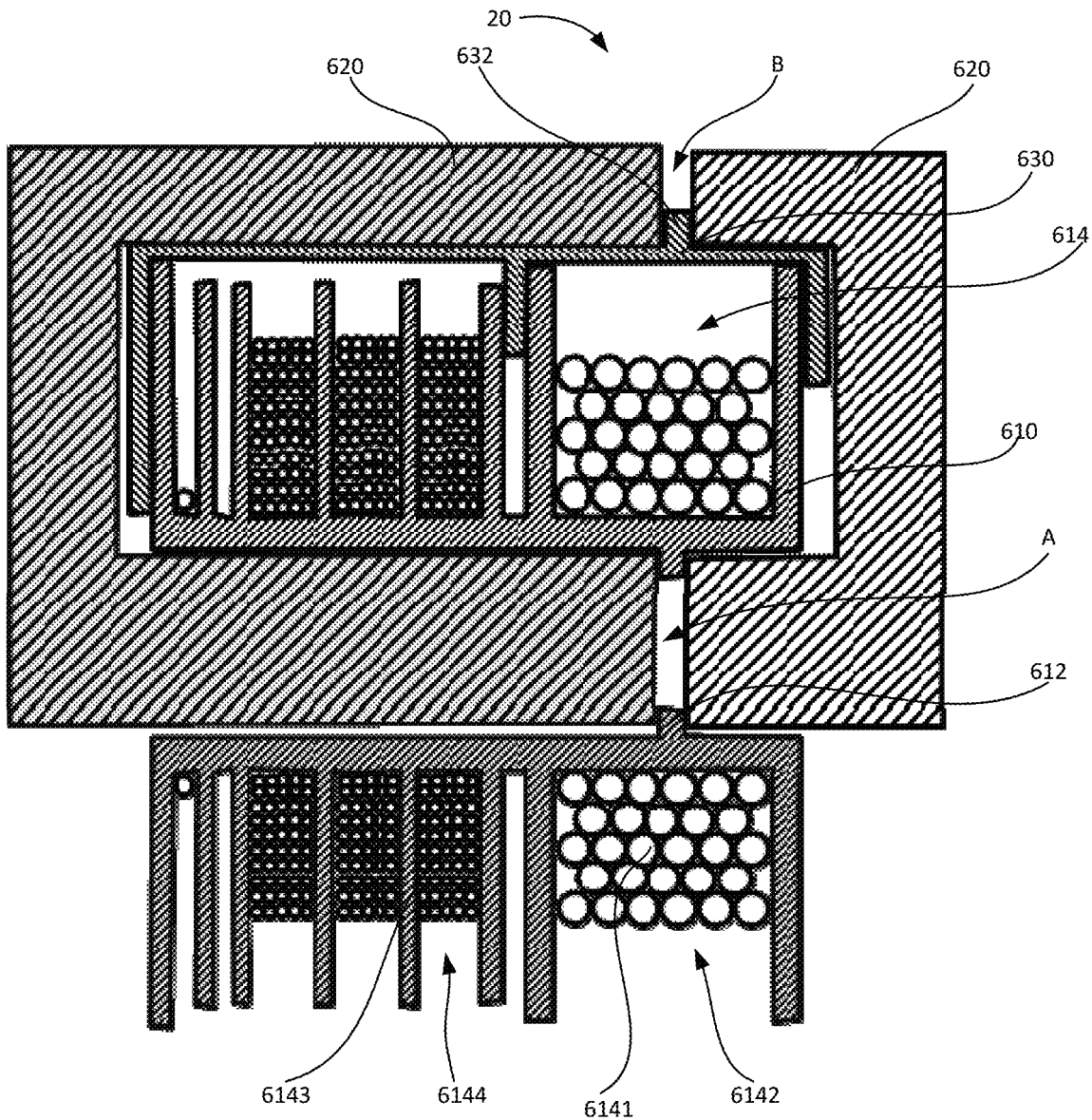
FIG. 9 is another schematic sectional view of a transformer according to an embodiment of the present disclosure.

In some embodiments, referring to FIG. 7 to FIG. 9, the transformer 20 includes an insulating bobbin 610 and two magnetic cores 620. The two magnetic cores 620 are oppositely inserted in the bobbin 610. A first spacer element 612 is disposed on an inner wall 611 of the bobbin 610, the first spacer element 612 includes a first spacer block 6122 and a second spacer block 6124 connected to the first spacer block 6122, and a thickness D2 of the second spacer block 6124 is different from a thickness D1 of the first spacer block 6122. First ends of the two magnetic cores 620 are respectively separated by the first spacer block 6122 or the second spacer block 6124.

In the transformer 20 of the above embodiments, since the bobbin 610 is provided therein with the first spacer block 6122 and the second spacer block 6124 with different thicknesses, and the two magnetic cores 620 may abut against the first spacer block 6122 or the second spacer block 6124 according to actual needs to adjust the size of the space between the two magnetic cores 620, so that the transformer 20 may meet the requirements of different specifications or models the overall cost of the transformer 20 is lower, and the production efficiency is higher.

In one embodiment, in an example, the insulating bobbin 610 may be made of a resin material. The magnetic core 620 may be a copper core, an iron core, or the like.

In one embodiment, in the related art, a preset gap needs to be maintained between two oppositely inserted magnetic cores of a transformer according to actual requirements, so that the transformer may meet the preset magnetic gap requirements. The two magnetic cores will produce eddy current loss in the process of alternating magnetization, and the magnetic gap is beneficial to the reduction of the eddy current loss. In addition, the coupling ratio of the transformer is related to the size of the magnetic gap, as well as the stack height and winding width of the winding. In other words, in order to maintain a suitable coupling ratio for the transformer, the magnetic gap between the two magnetic cores or the stack height and winding width of the winding may be adjusted. In this embodiment of the present disclosure, since the two magnetic cores 620 may be separated by the first spacer block 6122 or the second spacer block 6124, the transformer 20 may meet the requirements of different specifications or models, and the transformer 20 may meet different coupling ratio requirements.

Figure 10:
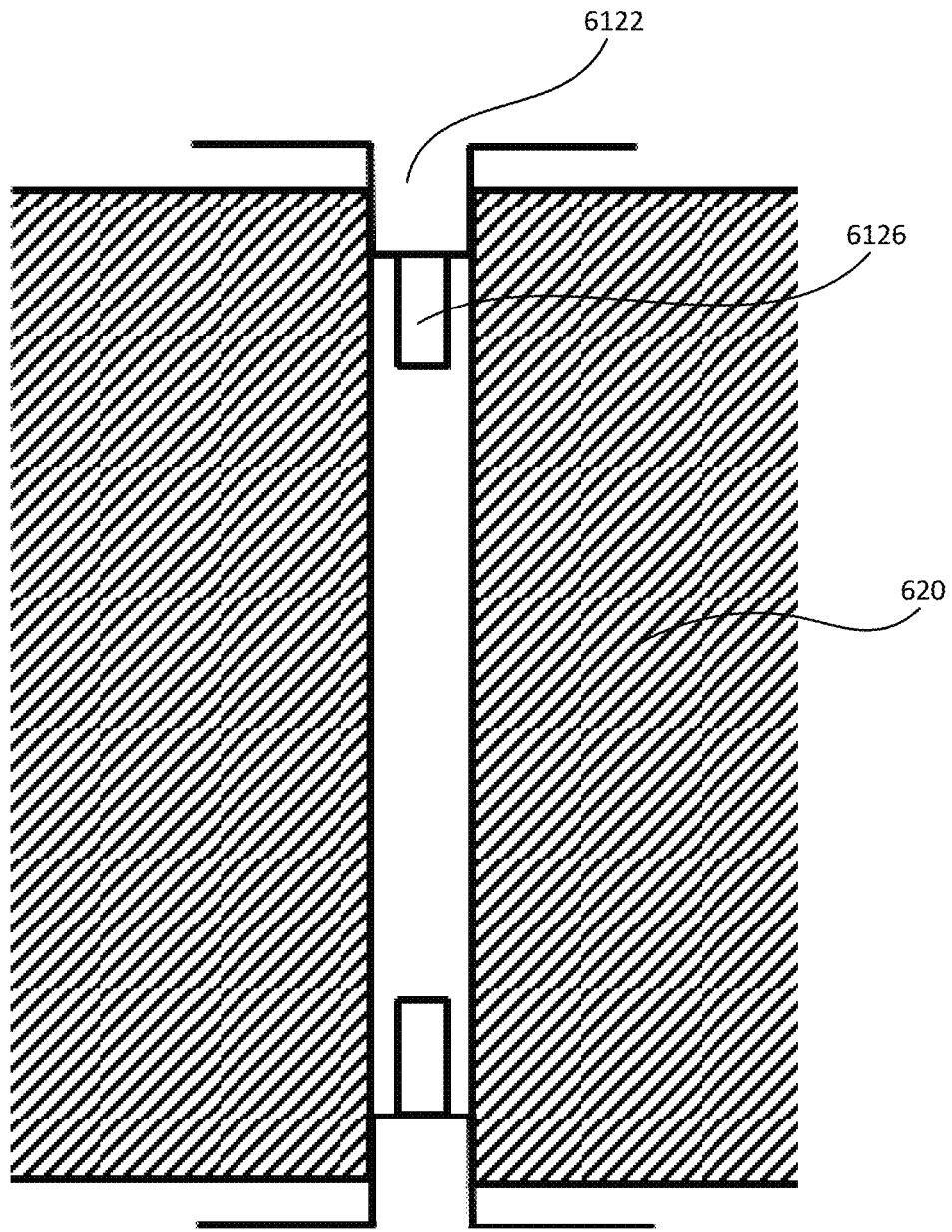
FIG. 10 is a schematic structure diagram of a first spacer element of a transformer according to an embodiment of the present disclosure where a second spacer block is removed.
Figure 11:
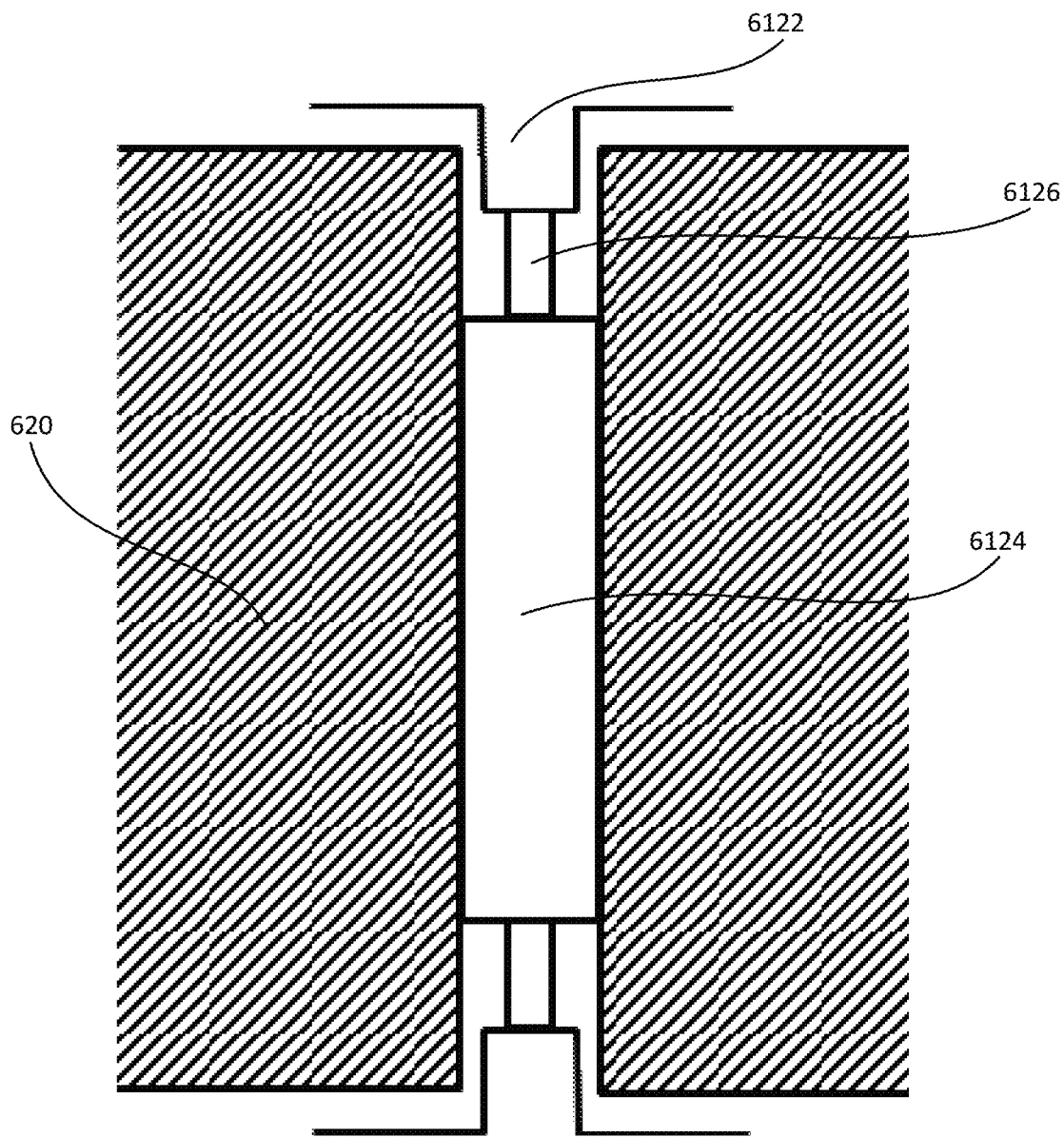
FIG. 11 is a schematic structure diagram of a part of a transformer according to an embodiment of the present disclosure.

It should be noted that in the example of FIG. 8, the thickness D1 of the first spacer block 6122 is smaller than the thickness D2 of the second spacer block 6124, when the gap between the two magnetic cores 620 of the transformer 20 needs to meet the thickness D2 of the second spacer block 6124, first ends of the two magnetic cores 620 may directly abut against two sides of the second spacer block 6124 (see FIG. 11). At this time, the first spacer block 6122 is still connected with the second spacer block 6124. When the gap between the two magnetic cores 620 of the transformer 20 needs to meet the thickness D1 of the first spacer block 6122, the connection between the first spacer block 6122 and the second spacer block 6124 may be broken, for example, may be directly cut to make the second spacer block 6124 detached from the transformer 20, so that the two magnetic cores 620 may directly abut against two opposite sides of the first spacer block 6122 (see FIG. 10).

Figure 12:
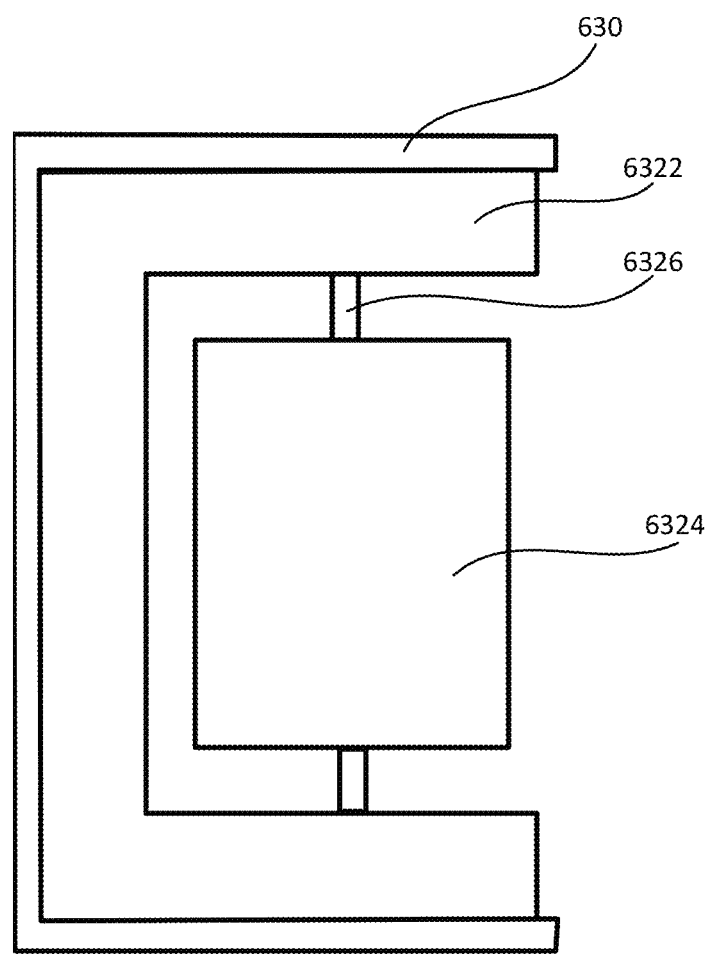
FIG. 12 is a schematic structure diagram of a second spacer element according to an embodiment of the present disclosure.
Figure 13:
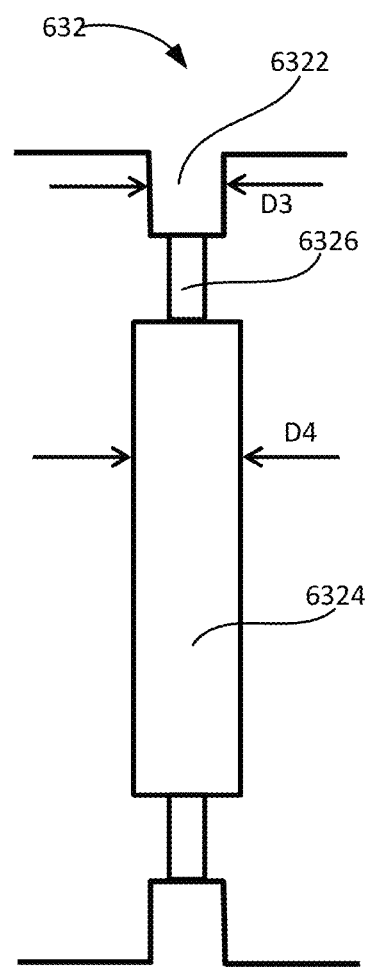
FIG. 13 is another schematic structure diagram of a second spacer element according to an embodiment of the present disclosure.

Referring to FIG. 9, FIG. 12 and FIG. 13, a winding groove 614 is formed on an outside of the bobbin 610, the transformer 20 includes a cover portion 630, the cover portion 630 at least partially covers the winding groove 614, and includes a second spacer element 632 at a position corresponding to the first spacer element 612. The second spacer element 632 includes a third spacer block 6322 and a fourth spacer block 6324 connected to the third spacer block 6322, a thickness D3 of the third spacer block 6322 is the same as the thickness D1 of the first spacer block 6122, and a thickness D4 of the fourth spacer block 6324 is the same as the thickness D2 of the second spacer block 6124. When the first ends of the two magnetic cores 620 are respectively separated by the first spacer block 6122, second ends of the two magnetic cores 620 are respectively separated by the third spacer block 6322, and when the first ends of the two magnetic cores 620 are respectively separated by the second spacer block 6124, the second ends of the two magnetic cores 620 are respectively separated by the fourth spacer block 6324.

In this way, the two magnetic cores 620 are separated by the first spacer block 6122 and the third spacer block 6322 at two ends, or the two magnetic cores 620 are separated by the second spacer block 6124 and the fourth spacer block 6324 at two ends, such that the transformer 20 may meet the requirements of different specifications or models, the overall cost of the transformer 20 is lower, and the production efficiency is higher.

It should be noted that the shape and size of the first spacer block 6122 may be the same as or different from that of the third spacer block 6322. The shape and size of the second spacer block 6124 may be the same as or different from that of the fourth spacer block 6324. In an embodiment, the first spacer block 6122 is configured to separate the first ends of the two magnetic cores 620, and the third spacer block 6322 is configured to separate the second ends of the two magnetic cores 620. In another embodiment, the second spacer block 6124 is configured to separate the first ends of the two magnetic cores 620, and the fourth spacer block 6324 is configured to separate the second ends of the two magnetic cores 620. The first spacer element 612 is located in a central gap A of the bobbin 610. The second spacer element 632 is located in a gap B at a side of the cover portion 630.

Referring to FIG. 7, in some embodiments, the first spacer element 612 includes a connecting portion 6126, which connects the first spacer block 6122 and the second spacer block 6124. Relative to the first spacer block 6122, the second spacer block 6124 is closer to the center of the bobbin 610. The thickness D2 of the second spacer block 6124 is greater than the thickness D1 of the first spacer block 6122, the first spacer block 6122 is disposed on the inner wall 611 of the bobbin 610, and a thickness of the connecting portion 6126 is smaller than the thickness D1 of the first spacer block 6122.

In this way, the first spacer block 6122 and the second spacer block 6124 are connected by the connecting portion 6126, and the thickness of the connecting portion 6126 is smaller than that of the first spacer block 6122, such that when the two magnetic cores 620 need to meet the gap of the thickness D1 of the first spacer block 6122, the connection between the second spacer block 6124 and the connecting portion 6126 may be disconnected to make the second spacer block 6124 quickly detached from the transformer 20.

In one embodiment, the thickness D1 of the first spacer block 6122 may range from 1.3 mm to 1.7 mm. The thickness D2 of the second spacer block 6124 may range from 1.8 mm to 2.2 mm.

In one embodiment, in some embodiments, the first spacer block 6122 as a whole may be in a continuous ring shape and arranged around the second spacer block 6124. The second spacer block 6124 may be a solid disc. Since the first spacer block 6122 is disposed on the inner wall 611 of the bobbin 610, and the second spacer block 6124 is closer to the center of the bobbin 610, in this way, when the two magnetic cores 620 need to meet the gap of the thickness D2 of the second spacer block 6124, the first ends of the two magnetic cores 620 may be directly abutted against the two opposite sides of the second spacer block 6124. At this time, the first spacer block 6122 is not in direct contact with the magnetic core 620, that is, the first spacer block 6122 does not function as a spacer to separate the magnetic cores 620. When the two magnetic cores 620 need to meet the gap of the thickness D1 of the first spacer block 6122, the connecting portion 6126 connecting the first spacer block 6122 and the second spacer block 6124 can be directly and quickly broken to make the second spacer block 6124 detached from the transformer 20, in this way, the first ends of the two magnetic cores 620 may abut against the two opposite sides of the first spacer block 6122 disposed on the inner wall 611 of the bobbin 610.

Referring to FIG. 9, in some embodiments, the winding groove 614 includes a primary winding groove 6142 and a secondary winding groove 6144, and the transformer 20 includes a primary winding 6141 wound in the primary winding groove 6142 and a secondary winding 6143 wound in the secondary winding groove 6144. In this way, the structure of the transformer 20 is simple.

In one embodiment, the primary winding 6141 and the secondary winding 6143 may be made of copper wires and aluminum wires with higher electrical conductivity. In some embodiments, the primary winding 6141 and the secondary winding 6143 each may be a layered winding. The layered winding has a compact structure and high production efficiency.

Figure 14:
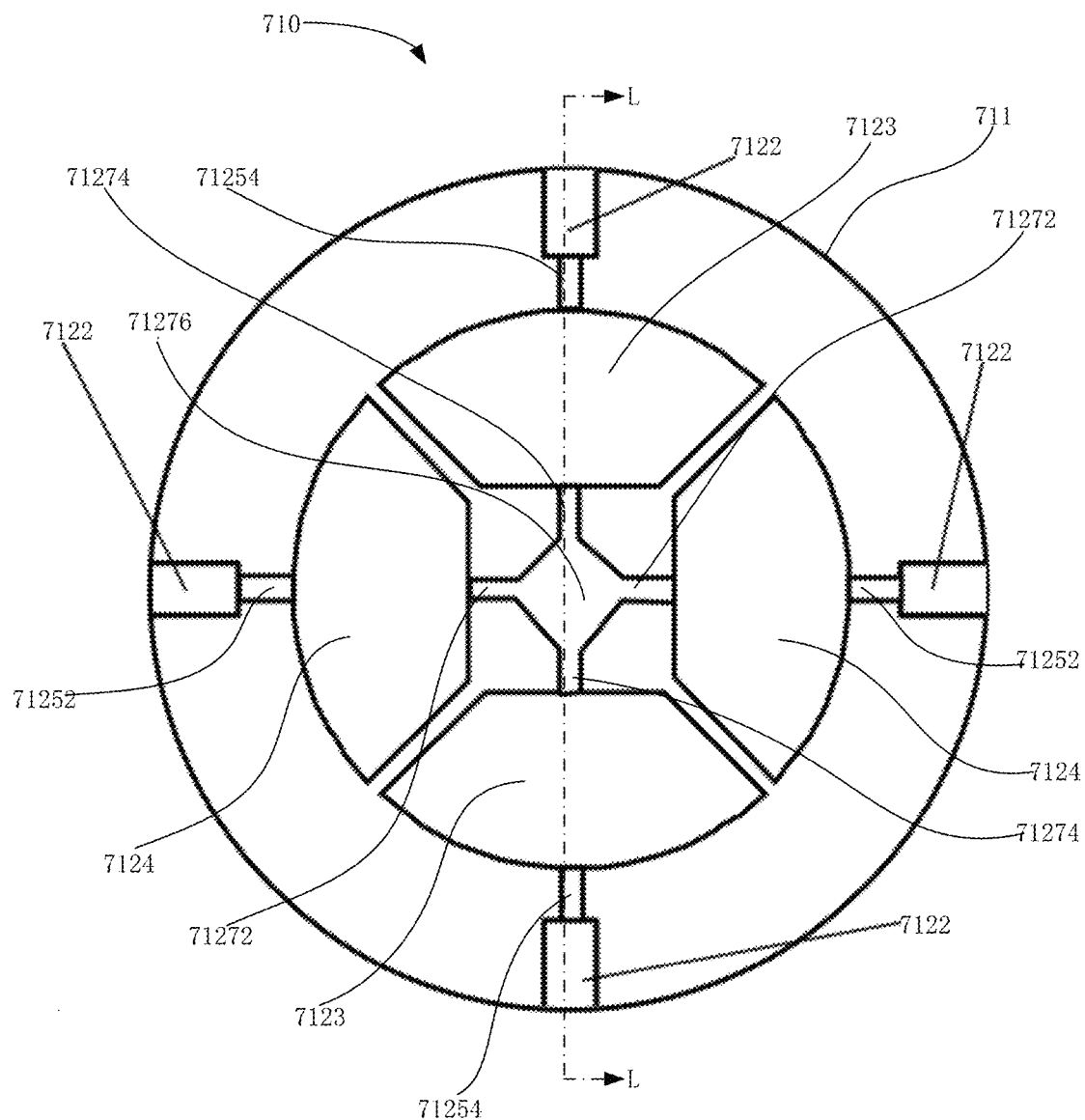
FIG. 14 is another schematic structure diagram of a first spacer element according to an embodiment of the present disclosure.
Figure 15:
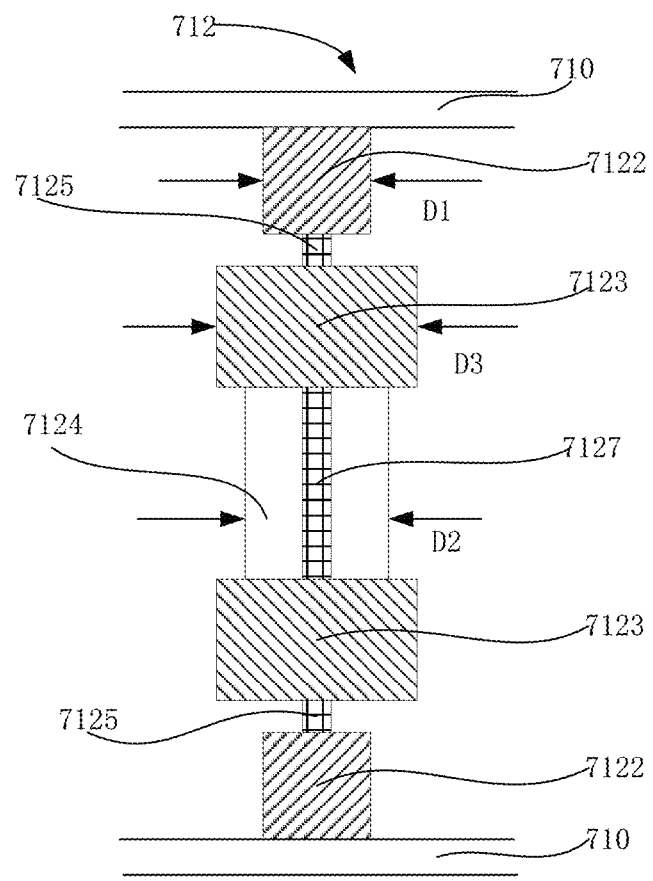
FIG. 15 is a schematic sectional view of the first spacer element shown in FIG. 14 along an L-L line.
Figure 16:
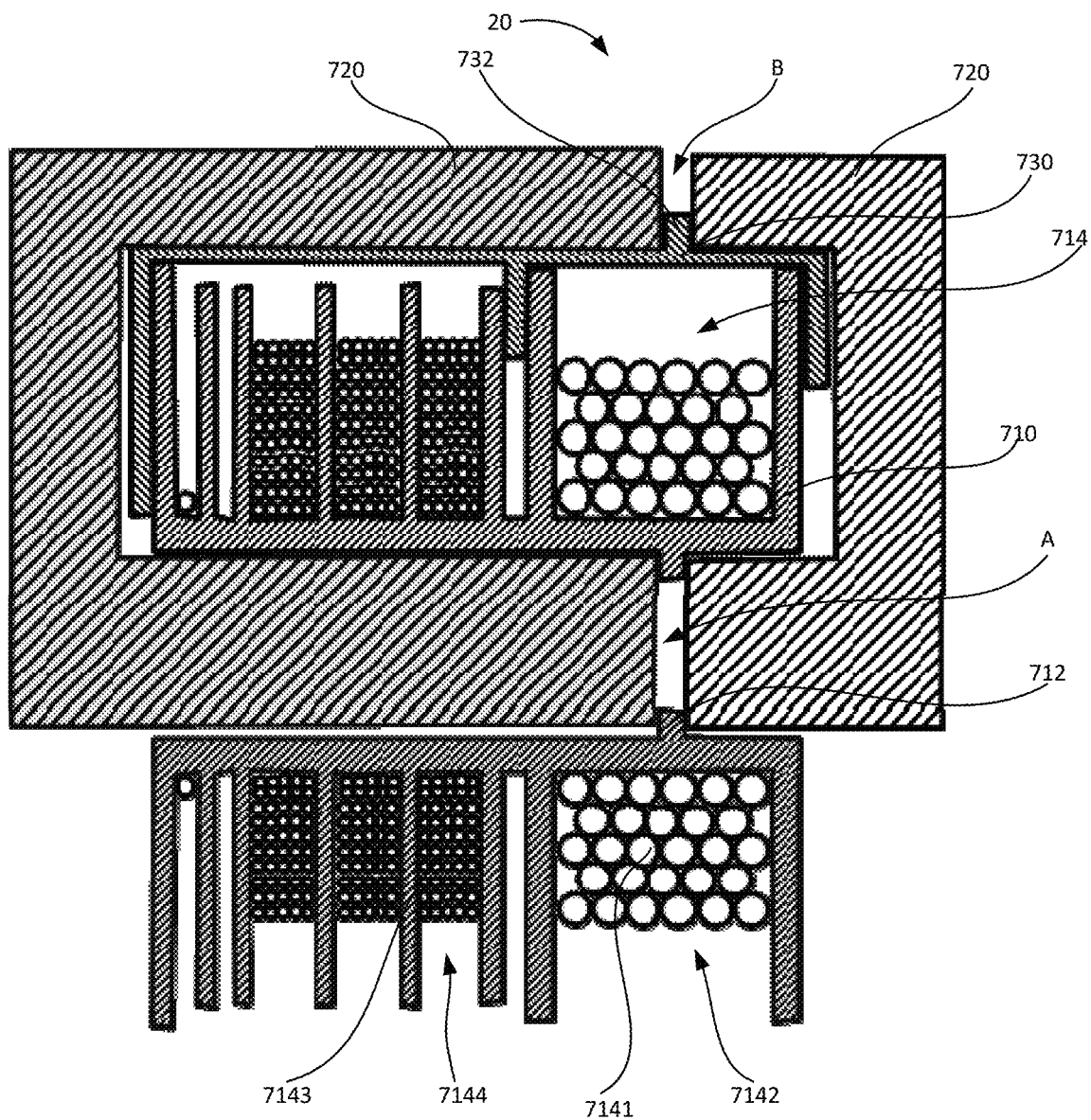
FIG. 16 is yet another schematic sectional view of a transformer according to an embodiment of the present disclosure.

In some embodiments, referring to FIG. 14 to FIG. 16, the transformer 20 includes an insulating bobbin 710 and two magnetic cores 720. Two magnetic cores 720 are oppositely inserted in the bobbin 710. A first spacer element 712 is disposed on an inner wall 711 of the bobbin 710, and the first spacer element 712 includes a first spacer block 7122, a second spacer block 7124 and a third spacer block 7123. The first spacer block 7122 is connected to the inner wall 711 of the bobbin 710. Both the second spacer block 7124 and the third spacer block 7123 are connected to the first spacer block 7122. The thickness D1 of the first spacer block 7122 is smaller than the thickness D2 of the second spacer block 7124 and the thickness D3 of the third spacer block 7123. The thickness D2 of the second spacer block 7124 is different from the thickness D3 of the third spacer block 7123. First ends of the two magnetic cores 720 are separated by the first spacer block 7122 or the second spacer block 7124 or the third spacer block 7123, respectively.

In the transformer 20 of the above embodiments, since the bobbin 710 is provided therein with the first spacer block 7122, the second spacer block 7124 and the third spacer block 7123 with different thicknesses, and the two magnetic cores 720 may abut against the first spacer block 7122 or the second spacer block 7124 or the third spacer block 7123 according to actual needs to adjust the size of the space between the two magnetic cores 720, so that the transformer 20 may meet the needs of different specifications or models, the overall cost of the transformer 20 is lower, and the production efficiency is higher.

In one embodiment, in an example, the insulating bobbin 710 may be made of a resin material. The magnetic core 720 may be a copper core or an iron core.

In one embodiment, in the related art, a preset magnetic gap needs to be maintained between two oppositely inserted magnetic cores of a transformer according to actual requirements, so that the transformer may meet the preset magnetic gap requirement. The two magnetic cores will produce eddy current loss in the process of alternating magnetization, and the magnetic gap is beneficial to the reduction of the eddy current loss. In addition, the coupling ratio of the transformer is related to the size of the magnetic gap, as well as the stack height and winding width of the winding. In other words, in order to maintain a suitable coupling ratio for the transformer, the magnetic gap between the two magnetic cores or the stack height and winding width of the winding may be adjusted. In this embodiment of the present disclosure, since the two magnetic cores 720 may be separated by the first spacer block 7122 or the second spacer block 7124 or the third spacer block 7123, the transformer 20 may meet the requirements of different specifications or models. That is, without increasing the cost, the first spacer element 712 of this embodiment can adapt to three different characteristics of the transformer 20, and enable the transformer 20 to meet different coupling ratio requirements.

It should be noted that, in the example of FIG. 15, the thickness D1 of the first spacer block 7122 is smaller than the thickness D2 of the second spacer block 7124 and the thickness D3 of the third spacer block 7123, and the thickness D2 of the second spacer block 7124 is smaller than the thickness D3 of the third spacer block 7123.

In one embodiment, the thickness D1 of the first spacer block 7122 may range from 1.4 mm to 1.7 mm, the thickness D2 of the second spacer block 7124 may range from 1.9 mm to 2.2 mm, and the thickness D3 of the third spacer block 7123 may range from 2.4 mm to 2.7 mm.

In one embodiment, in some embodiments, the first spacer block 7122 as a whole may be in a continuous ring shape and arranged around the second spacer block 7124 and the third spacer block 7123. The second spacer block 7124 may include two solid spacer blocks in substantially a sector shape, and the third spacer block 7123 may also include two solid spacer blocks in substantially a sector shape. The two spacer blocks of the second spacer block 7124 and the two spacer blocks of the third spacer block 7123 are alternately arranged at intervals along a circumferential direction of the bobbin, and the second spacer block 7124 and the third spacer block 7123 together form a discontinuous ring structure. It cloud be understood that, in other embodiments, the second spacer block 7124 may also be a single spacer block, and the third spacer block 7123 may also be a single spacer block.

Figure 17:
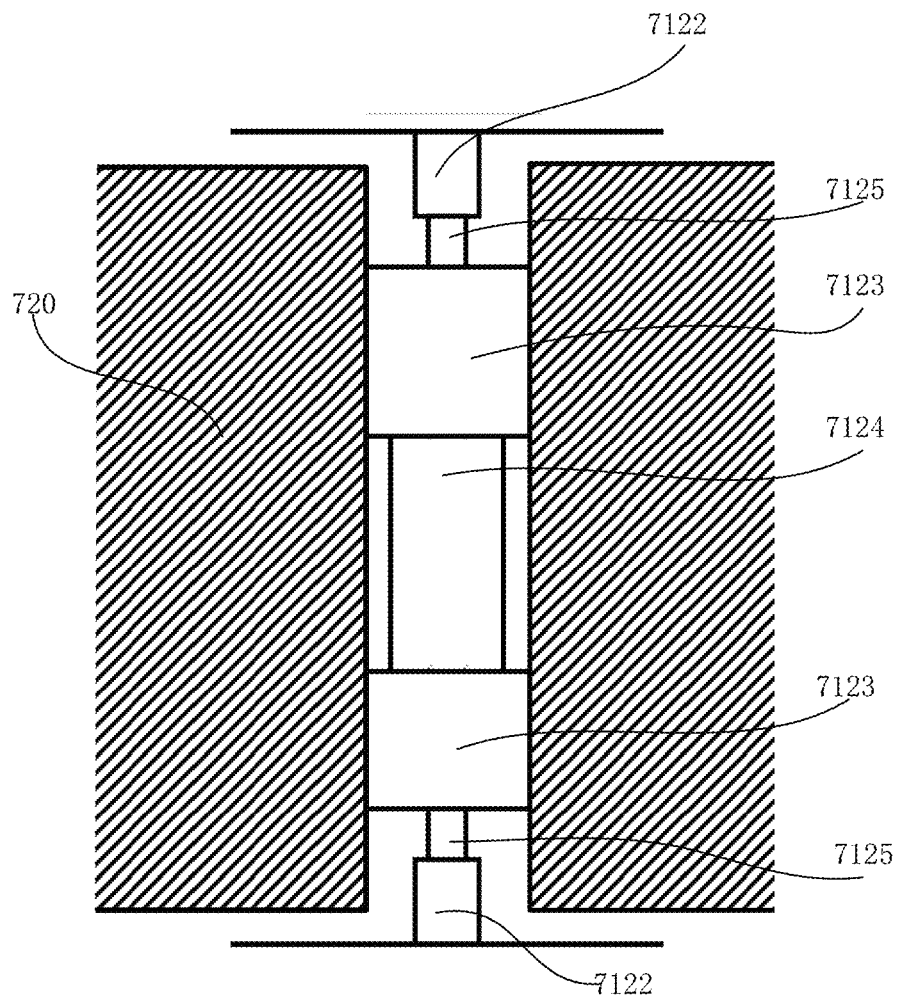
FIG. 17 is a schematic structure diagram of a part of a transformer according to an embodiment of the present disclosure.

When the magnetic gap between the two magnetic cores 720 of the transformer 20 needs to meet the thickness D3 of the third spacer block 7123, first ends of the two magnetic cores 720 may directly abut against two sides of the third spacer block 7123 (see FIG. 17). At this time, the first spacer block 7122 and the second spacer block 7124 are still connected with the third spacer block 7123.

Figure 18:
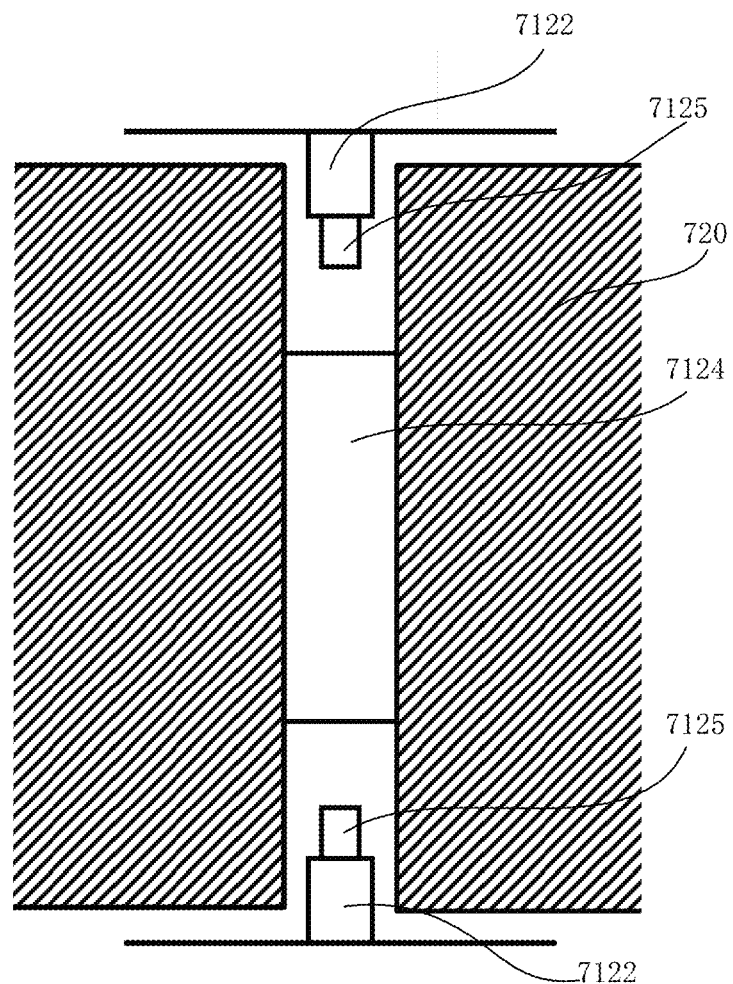
FIG. 18 is a schematic structure diagram of a first spacer element of a transformer according to an embodiment of the present disclosure where a third spacer block is removed.

When the magnetic gap between the two magnetic cores 720 of the transformer 20 needs to meet the thickness D2 of the second spacer block 7124, the connection (if present) between the third spacer block 7123 and the second spacer block 7124 may be disconnected (for example, may be cut off), and the connection between the third spacer block 7123 and the first spacer block 7122 may be disconnected, such that the third spacer block 7123 is detached from the first spacer element 712. At this time, the first ends of the two magnetic cores 720 may directly abut against two sides of the second spacer block 7124 (see FIG. 18).

Figure 19:
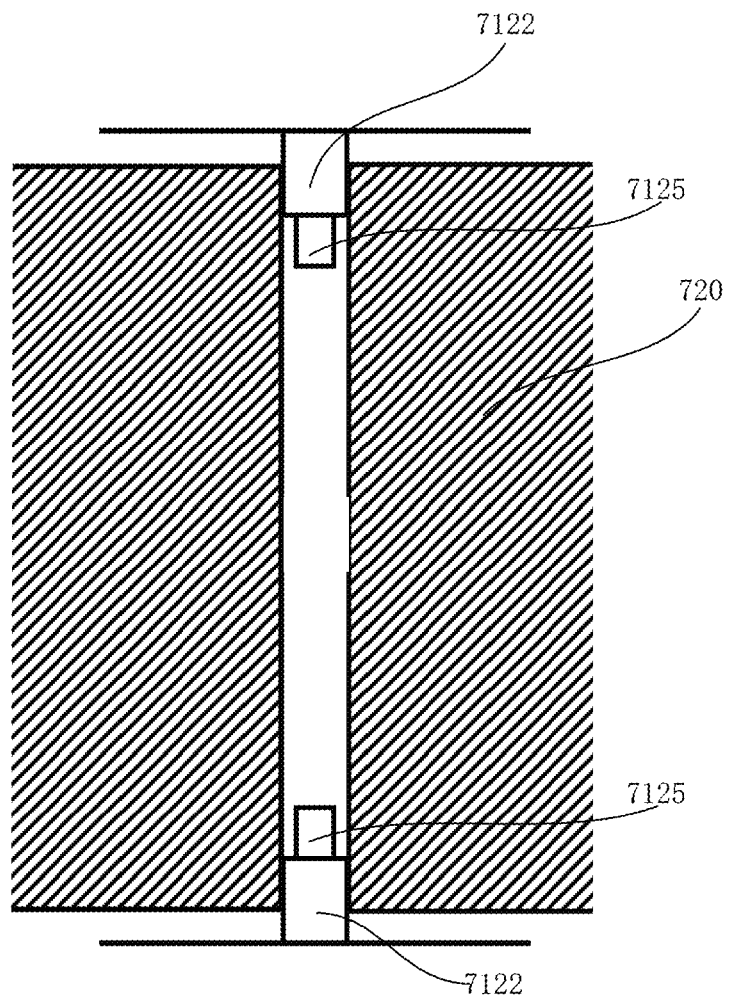
FIG. 19 is a schematic structure diagram of a first spacer element of a transformer according to an embodiment of the present disclosure where a second spacer block and a third spacer block are removed.

When the magnetic gap between the two magnetic cores 720 of the transformer 20 needs to meet the thickness D1 of the first spacer block 7122, the connection (if present) between the third spacer block 7123 and the first spacer block 7122 may be disconnected (for example, may be cut off), and the connection between the second spacer block 7124 and the first spacer block 7122 may be disconnected, such that the second spacer block 7124 and the third spacer block 7123 are both detached from the first spacer element 712. At this time, the first ends of the two magnetic cores 720 may directly abut against two sides of the first spacer block 7122 (see FIG. 19).

Referring to FIG. 14, in some embodiments, the first spacer element 712 includes a first connecting portion 7125, and the first connecting portion 7125 includes a first connecting element 71252 and a second connecting element 71254. The first connecting element 71252 connects the first spacer block 7122 and the second spacer block 7124, and the second connecting element 71254 connects the first spacer block 7122 and the third spacer block 7123.

In this way, through the connection functions of the first connecting element 71252 and the second connecting element 71254, the second spacer block 7124 and the third spacer block 7123 may be fixed to the first spacer block 7122, by disconnecting the first connector element 71252, the second spacer block 7124 may be quickly disconnected from the first spacer block 7122, and by disconnecting the second connector element 71254, the third spacer block 7123 may be quickly disconnected from the first spacer block 7122, such that the operation is simple.

Referring to FIG. 14, in some embodiments, there are a plurality of the first spacer blocks 7122. The plurality of the first spacer blocks 7122 are arranged at intervals along the circumferential direction of the bobbin 710. There are a plurality of the first connecting elements 71252. Each first connecting element 71252 connects one of the first spacer blocks 7122 and the second spacer block 7124. There are a plurality of the second connector elements 71254. Each second connecting element 71254 connects one of the first spacer block 7122 and the third spacer block 7123.

In this way, the manufacturing cost of the first spacer element 712 may be reduced, and the first connecting element 71252 and the second connecting element 71254 may be easily disconnected.

In one embodiment, in an example, the plurality of the first spacer block 7122 are evenly arranged at intervals along the circumferential direction of the bobbin 710, so that the second spacer block 7124 may be uniformly stressed. The plurality of the first spacer blocks 7122 form a discontinuous ring structure. For example, in the example shown in FIG. 14, the number of the first spacer block 7122 is four, and the four first spacer blocks 7122 are arranged at intervals of 90 degrees along the circumferential direction of the bobbin 710. The number of the second spacer block 7124 is two, the number of the third spacer block 7123 is also two, and the second spacer blocks 7124 and the third spacer blocks 7123 are alternately arranged in the ring structure formed by the plurality of the first spacer blocks 7122. Each second spacer block 7124 maintains a preset distance from each of the adjacent third spacer blocks 7123, the arc of each second spacer block 7124 is 90 degrees, and the arc of each third spacer block 7123 is also 90 degrees.

Further, the two first spacer blocks 7122, the first connecting element 71252 and the second spacer block 7124 arranged horizontally may be located in the same horizontal plane. The two first spacer blocks 7122, the second connecting element 71254 and the third spacer block 7123 arranged vertically may be located in the same vertical plane.

In some embodiments, the first spacer element 712 includes a second connecting portion 7127, and the second connecting portion 7127 connects the second spacer block 7124 and the third spacer block 7123.

In this way, the second spacer block 7124 and the third spacer block 7123 may be connected together through the second connecting portion 7127, such that the structure of the first spacer element 712 is relatively stable.

In one embodiment, the second connecting portion 7127 may be located at a central position of the first spacer element 712. Referring to FIG. 14 and FIG. 15, in some embodiments, the second connecting portion 7127 includes a plurality of third connecting elements 71272, a plurality of fourth connecting elements 71274 and a fifth connecting element 71276, the third connecting elements 71272 and the four connecting elements 71274 are alternately connected to sides of the fifth connecting element 71276 along the circumferential direction of the bobbin 710, each third connecting element 71272 connects the second spacer block 7124 and the fifth connecting element 71276, and each fourth connecting element 71274 connects the third spacer block 7123 and the fifth connecting element 71276.

In this way, through the third connecting elements 71272, the fourth connecting elements 71274 and the fifth connecting element 71276, the second spacer block 7124 and the third spacer block 7123 may be connected together, and the structure is simple, and by cutting off the third connecting elements 71272 or the four connecting elements 71274, the second spacer block 7124 and the third spacer block 7123 may be quickly disconnected.

In one embodiment, the fifth connecting element 71276 has a rhombus structure or a square structure, and the third connecting element 71272 and the fourth connecting element 71274 may have a strip structure. The number of the third connecting element 71272 is two, and the number of the fourth connecting element 71274 is two. The two third connecting elements 71272 are respectively connected to two corner positions on one diagonal line of the fifth connecting element 71276, and the two fourth connecting elements 71274 are respectively connected to two corner positions on the other diagonal line of the fifth connecting element 71276. The second connecting portion 7127 formed in this way can provide the first spacer element 712 with a more uniform connection strength.

In an embodiment, disconnecting the first connecting element 71252 and the third connecting element 71272 may make the second spacer block 7124 detached from the first spacer element 712, and disconnecting the second connecting element 71254 and the fourth connecting element 71274 may make the third spacer block 7123 detached from the first spacer element 712. At this time, the first ends of the two magnetic cores 720 may directly abut against the two opposite sides of the first spacer block 7122 (see FIG. 19).

In another embodiment, disconnecting the second connecting element 71254 and the fourth connecting element 71274 may make the third spacer block 7123 detached from the first spacer element 712. At this time, the first ends of the two magnetic cores 720 may directly abut against the two opposite sides of the second spacer block 7124 (see FIG. 18).

In yet another embodiment, the second spacer block 7124 and the third spacer block 7123 are connected together by the second connecting portion 7127. At this time, the first ends of the two magnetic cores 720 may directly abut against the two opposite sides of the third spacer block 7123 (see FIG. 17).

In some embodiments, a thickness of the first connecting portion 7125 is not greater than the thickness D1 of the first spacer block 7122, and a thickness of the second connecting portion 7127 is not greater than the smaller one of the thickness of the second spacer block 7124 and the thickness of the third spacer block 7123.

In this way, the first spacer block 7122, the second spacer block 7124, and the third spacer block 7123 play a spacer role to prevent the thicker connecting portion from being in contact with the first ends of the magnetic cores 720 and affecting the distance between the first ends of the two magnetic cores 720.

It should be understood that the thickness of the first connecting portion 7125 is not greater than the thickness D1 of the first spacer block 7122. That is, in an example, the thickness of the first connecting portion 7125 may be equal to the thickness D1 of the first spacer block 7122, or in another example, the thickness of the first connecting portion 7125 may be smaller than the thickness D1 of the first spacer block 7122. The thickness of the second connecting portion 7127 is not greater than the smaller one of the thickness of the second spacer block 7124 and the thickness of the third spacer block 7123. That is, in an example, the thickness of the second connecting portion 7127 may be equal to the smaller one of the thickness of the second spacer block 7124 and the thickness of the third spacer block 7123, or in another example, the thickness of the second connecting portion 7127 is smaller than the smaller one of the thickness of the second spacer block 7124 and the thickness of the third spacer block 7123. It should be pointed out that the settings of the thicknesses and positions of the spacer blocks and the connecting portions are to ensure that the separation of the two magnetic cores 720 is realized by the spacer block, and the connection between the spacer blocks is realized by the connecting portion. In addition, the smaller thickness of the connecting portion facilitates the operation when disconnecting the connecting portion.

In some embodiments, the second connecting portion 7127 is located at the center of the ring structure formed by the plurality of the first spacer blocks 7122, and the second spacer block 7124 and the third spacer block 7123 surround the second connecting portion 7127. In this way, the structure of the first spacer element is simple and stable, and it is not easy to deform as a whole, ensuring the assembling efficiency of the transformer 100, and making the disconnection of the second spacer block 7124 and the third spacer block 7123 easy.

Figure 20:
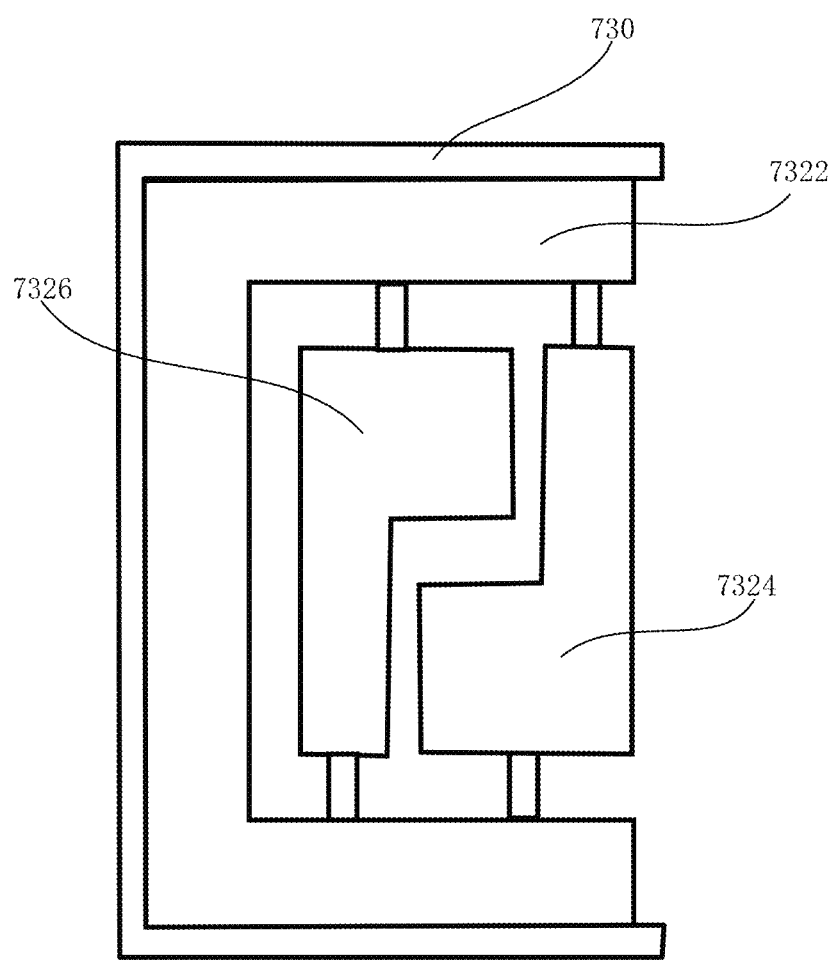
FIG. 20 is yet another schematic structure diagram of a second spacer element according to an embodiment of the present disclosure.
Figure 21:
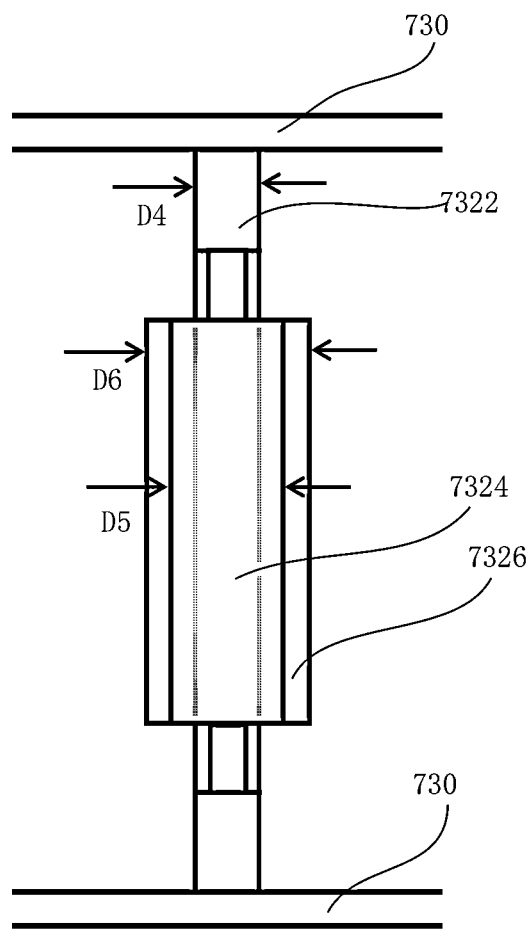
FIG. 21 is still another schematic structure diagram of a second spacer element according to an embodiment of the present disclosure.

Referring to FIG. 16, FIG. 20 and FIG. 21, in some embodiments, a winding groove 714 is formed on the outside of the winding bobbin 710. The transformer 20 includes a cover portion 730, and the cover portion 730 at least partially covers a part of the winding groove 714. The cover portion 730 includes a second spacer element 732 at a position corresponding to the first spacer element 712. The second spacer element 732 includes a fourth spacer block 7322, a fifth spacer block 7324, and a sixth spacer block 7326. The fifth spacer block 7324 and the sixth spacer block 7326 are both connected to the third spacer block 7123. A thickness D4 of the fourth spacer block 7322 is the same as the thickness D1 of the first spacer block 7122. A thickness D5 of the fifth spacer block 7324 is the same as the thickness D2 of the second spacer block 7124. A thickness D6 of the sixth spacer block 7326 is the same as the thickness D3 of the third spacer block 7123.

When the first ends of the two magnetic cores 720 are respectively separated by the first spacer block 7122, second ends of the two magnetic cores 720 are respectively separated by the fourth spacer block 7322. When the first ends of the two magnetic cores 720 are respectively separated by the second spacer block 7124, the second ends of the two magnetic cores 720 are respectively separated by the fifth spacer block 7324. When the first ends of the two magnetic cores 720 are respectively separated by the third spacer block 7123, the second ends of the two magnetic cores 720 are respectively separated by the sixth spacer block 7326.

In this way, the two magnetic cores 720 are separated by the first spacer block 7122 and the fourth spacer block 7322 at two ends, or the two magnetic cores 720 are separated by the second spacer block 7124 and the fifth spacer block 7324 at two ends, or the two magnetic cores 720 are separated by the third spacer block 7123 and the sixth spacer block 7326 at two ends, so that the transformer 20 may meet the needs of different specifications or models, the overall cost of the transformer 20 is lower, and the production efficiency is higher.

It should be noted that the shape and size of the first spacer block 7122 may be the same as or different from that of the fourth spacer block 7322. The shape and size of the second spacer block 7124 may be the same as or different from that of the fifth spacer block 7324. The shape and size of the third spacer block 7123 may be the same as or different from that of the sixth spacer block 7326. In an embodiment, the first spacer block 7122 is configured to separate the first ends of the two magnetic cores 720, and the fourth spacer block 7322 is configured to separate the second ends of the two magnetic cores 720. In another embodiment, the second spacer block 7124 is configured to separate the first ends of the two magnetic cores 720, and the fifth spacer block 7324 is configured to separate the second ends of the two magnetic cores 720. In yet another embodiment, the third spacer block 7123 is configured to separate the first ends of the two magnetic cores 720, and the sixth spacer block 7326 is configured to separate the second ends of the two magnetic cores 720. The first spacer element 712 is located in a central magnetic gap A formed by the first ends of the two magnetic cores 720 in the bobbin 710. The second spacer element 732 is located in a gap B formed by the second ends of the two magnetic cores 720 at a side of the cover portion 730.

Referring to FIG. 16, in some embodiments, a winding groove 714 is formed on the outside of the bobbin 710, the winding groove 714 includes a primary winding groove 7142 and a secondary winding groove 7144, and the transformer 20 includes a primary winding 7141 wound in the primary winding groove 7142 and a secondary winding 7143 wound in the secondary winding groove 7144. In this way, the structure of the transformer 20 is simple.

In one embodiment, the primary winding 7141 and the secondary winding 7143 may be made of copper wires and aluminum wires with higher electrical conductivity. In some embodiments, the primary winding 7141 and the secondary winding 7143 each may be a layered winding. The layered winding has a compact structure and high production efficiency. In this embodiment, the primary winding groove 7142 is a single winding groove, and the secondary winding groove 7144 includes three sub-winding grooves.

Referring to FIG. 2, embodiments of the present application also provide a microwave cooking appliance 200. The microwave cooking appliance 200 includes the electronic transformer 100 as described in any embodiment hereinbefore and a microwave generator 210. The electronic transformer 100 is connected to the microwave generator 210.

In the microwave cooking appliance 200 of the above embodiments, since the switch device 30 may provide the on/off signal to the transformer 20, it may play a role of protecting the circuit when the AC source 50 is unstable. In addition, the control device 40 may control the switching frequency of the switch device 30, such that the electronic transformer 100 may stably output the voltage to the microwave generator 210, and the manufacturing cost of the microwave cooking appliance 200 according to embodiments of the present disclosure is low.

In one embodiment, the microwave generator 210 includes a magnetron. The magnetron is an electric vacuum device used to generate microwave energy. The magnetron is a diode placed in a constant magnetic field. Electrons in the magnetron interact with the high-frequency electromagnetic field under the control of the mutually perpendicular constant magnetic field and constant electric field to convert the energy obtained from the output power of the electronic transformer 100 into the microwave energy, achieving the purpose of generating the microwave energy.

In some embodiments, the microwave cooking appliance 200 includes an upper computer 220, the upper computer 220 is connected to the electronic transformer 100, and is configured to receive an input instruction based on frequency settings and send a control signal to the electronic transformer 100. The control device 40 is configured to control an output power of the electronic transformer 100 according to the input instruction.

In this way, the microwave cooking appliance 200 may control the output power of the electronic transformer 100 according to the user's input instruction, the operation is flexible and the user experience is good.

In one embodiment, the upper computer 220 may be a control board 230 or a computer board of the microwave cooking appliance 200. The control board 230 or the computer board is provided with keys, and the user may operate the keys to set and input the output power of the microwave cooking appliance 200. Of course, the upper computer 220 is not limited to the above-mentioned embodiments, and other embodiments may be selected according to actual needs. For example, the upper computer 220 may transmit the power input by the user to the electronic transformer 100 in a wired or wireless manner.

In one embodiment, in an embodiment, the preset power of the electronic transformer 100 is 1000 W, and the output power of the microwave cooking appliance 200 set and input by the user through the upper computer 220 is 800 W. Within a unit time (such as 10 s), the processor 44 of the control device 40 controls the switching element 110 to turn on for 8 s and turn off for 2 s, then the average output power of the electronic transformer 100 within the unit time is 800 W. That is, the output power of the electronic transformer 100 per unit time may be equal to the power input by the user when operating the microwave cooking appliance 200.

In some embodiments, when the electronic transformer includes the switching element 110, the switching element 110 may be disposed in the control board 230, an electric control board or the computer board, and the upper computer 220 may send the user's input instruction to the control device 40 in a wired or wireless manner. Based on the user's input instruction, the control device 40 may send the control signal to the control board 230 or the computer board in a wired or wireless manner, and then the control board 230 or the computer board controls the on/off ratio of the switching element 110.

In some embodiments, the upper computer 220 is configured to receive an input instruction based on the frequency settings and control the output power of the electronic transformer 100 according to the input instruction.

In this way, the upper computer 220 may directly control the on/off ratio of the switching element 110 according to the user's input instruction, controlling the output power of the electronic transformer 100.

In an example, the preset power of the electronic transformer 100 is 1000 W, and the power input by the user through the upper computer 220 is 800 W. Within a unit time (such as 10 s), the upper computer 220 controls the switching element 110 to turn on for 8 s and turn off for 2 s, then the average output power of the electronic transformer 100 within the unit time (such as 10 s) is 800 W. That is, the output power of the electronic transformer 100 per unit time may be equal to the power input by the user when operating the microwave cooking appliance 200. It should be noted that the output power of the electronic transformer 100 may be understood to be consistent with the power input by the user through the upper computer 220, while the preset power of the electronic transformer 100 is a power preset by the control device of the electronic transformer.

Figure 22:
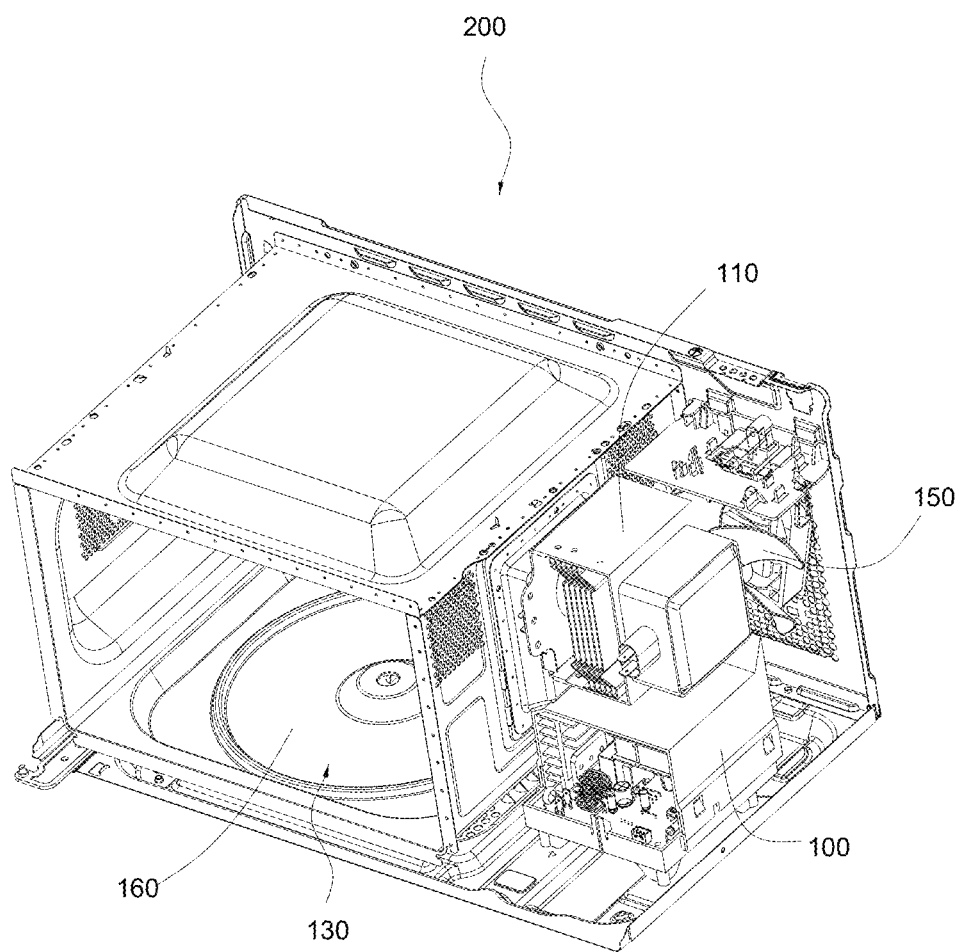
FIG. 22 is a schematic structure diagram of a microwave cooking appliance according to an embodiment of the present disclosure.

Referring to FIG. 22, the microwave cooking appliance 200 further includes a cavity 130, a door body (not shown) and a fan 150. A tray 160 is provided in the cavity 130 for placing food to be heated. The door body is rotatably disposed in front of the cavity 130 to open or close an opening of the cavity 130. The microwave generator 110 and the transformer 20 are installed outside the cavity 130 and arranged in a blowing direction of the fan 150. When the microwave cooking appliance 200 works, the transformer 20 provides a working current to the microwave generator 110, and the microwave generator 110 generates microwave energy for heating the food in the cavity 130. At the same time, the fan 150 may suck in air from the outside and form an air flow. The air flow may be conducted in the transformer 20 through an air duct and cool the transformer 20. After cooling the transformer 20, the air flow may be discharged from the transformer 20 to the outside of the microwave cooking appliances 200.

Reference throughout this specification to "an embodiment," "some embodiments," "an exemplary embodiment," "an example," "a specific example," or "some examples," means that a particular feature, structure, material, or characteristic described in connection with embodiments or example is included in at least one embodiment or example of the present disclosure. Thus, the appearances of the phrases such as "in an embodiment," "in some embodiments," "in an exemplary embodiment," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more devices, segments or portions of codes of executable instructions for achieving specific logical functions or steps in the process, and the scope of a embodiment of the present disclosure includes other implementations, which may not be in the order shown or discussed, including executing functions in a substantially simultaneous manner or in the reverse order according to the functions involved.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In some embodiments, all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in embodiments of the present disclosure may be integrated in one processing device or may be separately physically present, or two or more units may be integrated in one device. The integrated device as described above may be achieved in the form of hardware, or may be achieved in the form of a software functional device. If the integrated device is achieved in the form of a software functional device and sold or used as a separate product, the integrated device may also be stored in a computer readable storage medium.

What is claimed is:

1. An electronic transformer, comprising:
a rectifier connected to an AC source;
a transformer connected to the rectifier;
a switch configured to provide an on/off signal to the transformer;
a controller connected to the switch, and configured to generate a control signal according to a preset power to the switch and control a switching frequency of the switch based on the control signal;
a voltage doubler rectifier connected to a secondary side of the transformer, and configured to increase an output voltage of the transformer;
a primary winding connected to the switch, with a winding width greater than a stack height of the primary winding; and
a secondary winding spaced apart from the primary winding, with a winding width smaller than a stack height of the secondary winding;
wherein the controller comprises a detector and a processor, the detector is configured to obtain a detection signal based on detection to the AC source and send the detection signal to the processor, and the processor is configured to control the switching frequency of the switch based on the detection signal;
wherein the electronic transformer further comprises a first sampler connected to an output terminal of the AC source and the detector respectively, and the detector is configured to collect the detection signal through the first sampler;
wherein the stack height of the secondary winding and the winding width of the secondary winding satisfy a following formula:

$1.1 < H2/W2 < 2.5$, where H2 represents the stack height of the secondary winding, and W2 represents the winding width of the secondary winding.

2. The electronic transformer according to claim 1, wherein the controller comprises a drive circuit connected to the switch and the processor, respectively, and configured to control the switching frequency of the switch according to the control signal output by the processor.

3. The electronic transformer according to claim 1, wherein the electronic transformer comprises a second sampler connected to an output terminal of the rectifier and the detector, respectively, the detector is configured to detect a current of the transformer through the second sampler, and the processor is configured to control the switching frequency of the switch according to the current of the transformer, a voltage of the AC source, and the preset power.

4. The electronic transformer according to claim 1, wherein the electronic transformer comprises an auxiliary transformer connected to the controller, and configured to detect a primary voltage of the transformer, and the controller is configured to turn off the switch when the primary voltage of the transformer is greater than a set voltage.

5. The electronic transformer according to claim 4, wherein the electronic transformer comprises a third sampler connected to the auxiliary transformer and the controller, respectively, and the controller is configured to detect the primary voltage of the transformer through the third sampler.

6. The electronic transformer according to claim 4, wherein the controller comprises an auxiliary power source connected to the auxiliary transformer.

7. The electronic transformer according to claim 1, wherein the electronic transformer comprises a switching element connected to the AC source and the rectifier, respectively, and the controller is configured to control an on/off time of the switching element to adjust an output power of the transformer per unit time; or
the switching element is configured to control the on/off time of the switching element by an upper processor of a microwave cooking appliance where the electronic transformer is applied.

8. The electronic transformer according to claim 1, wherein the transformer comprises an insulating bobbin defining a single primary winding groove and a single secondary winding groove spaced apart from each other, a coil of the primary winding is wound in the primary winding groove, and a coil of the secondary winding is wound in the secondary winding groove.

9. The electronic transformer according to claim 1, wherein the transformer comprises:
an insulating bobbin, a first spacer element being disposed on an inner wall of the bobbin and comprising a first spacer block and a second spacer block connected to the first spacer block, a thickness of the second spacer block being different from that of the first spacer block; and
two magnetic cores oppositely inserted in the bobbin, first ends of the two magnetic cores being separated by the first spacer block or the second spacer block.

10. The electronic transformer according to claim 9, wherein a winding groove is formed on an outside of the bobbin, the transformer comprises a cover portion, the cover portion at least partially covers the winding groove and comprises a second spacer element at a position corresponding to the first spacer element, the second spacer element comprises a third spacer block and a fourth spacer block connected to the third spacer block, a thickness of the third spacer block is the same as that of the first spacer block, and a thickness of the fourth spacer block is the same as that of the second spacer block;
when the first ends of the two magnetic cores are separated by the first spacer block, second ends of the two magnetic cores are separated by the third spacer block, and
when the first ends of the two magnetic cores are separated by the second spacer block, the second ends of the two magnetic cores are separated by the fourth spacer block.

11. The electronic transformer according to claim 1, wherein the transformer comprises:
an insulating bobbin, a first spacer element being disposed on an inner wall of the bobbin and comprising a first spacer block connected to the inner wall of the bobbin, as well as a second spacer block and a third spacer block both connected to the first spacer block, wherein a thickness of the first spacer block is smaller than that of the second spacer block and that of the third spacer block, and a thickness of the second spacer block is different from that of the third spacer block; and
two magnetic cores oppositely inserted in the bobbin, first ends of the two magnetic cores being separated by the first spacer block or the second spacer block or the third spacer block.

12. The electronic transformer according to claim 11, wherein a winding groove is formed on an outside of the bobbin, the transformer comprises a cover portion, the cover portion at least partially covers a part of the winding groove and comprises a second spacer element at a position corresponding to the first spacer element, the second spacer element comprises a fourth spacer block, a fifth spacer block and a sixth spacer block, the fifth spacer block and the sixth spacer block are both connected to the third spacer block, a thickness of the fourth spacer block is the same as that of the first spacer block, a thickness of the fifth spacer block is the same as that of the second spacer block, and a thickness of the sixth spacer block is the same as that of the third spacer block;
when the first ends of the two magnetic cores are separated by the first spacer block, second ends of the two magnetic cores are separated by the fourth spacer block;
when the first ends of the two magnetic cores are separated by the second spacer block, the second ends of the two magnetic cores are separated by the fifth spacer block; and
when the first ends of the two magnetic cores are separated by the third spacer block, the second ends of the two magnetic cores are separated by the sixth spacer block.

13. A microwave cooking appliance, comprising an electronic transformer and a microwave generator connected to the electronic transformer;
wherein the electronic transformer comprises:
a rectifier connected to an AC source;
a transformer connected to the rectifier;
a switch configured to provide an on/off signal to the transformer;
a controller connected to the switch, and configured to generate a control signal according to a preset power to the switch and control a switching frequency of the switch based on the control signal;
a voltage doubler rectifier connected to a secondary side of the transformer, and configured to increase an output voltage of the transformer;

a primary winding connected to the switch, with a winding width greater than a stack height of the primary winding; and a secondary winding spaced apart from the primary winding, with a winding width smaller than a stack height of the secondary winding;

wherein the controller comprises a detector and a processor, the detector is configured to obtain a detection signal based on detection to the AC source and send the detection signal to the processor, and the processor is configured to control the switching frequency of the switch based on the detection signal;

wherein the electronic transformer further comprises a first sampler connected to an output terminal of the AC source and the detector respectively, and the detector is configured to collect the detection signal through the first sampler;

wherein the stack height of the secondary winding and the winding width of the secondary winding satisfy a following formula:

$1.1 < H2/W2 < 2.5$, where H2 represents the stack height of the secondary winding, and W2 represents the winding width of the secondary winding.

14. The microwave cooking appliance according to claim 13, comprising:

an upper processor connected to the electronic transformer, wherein the upper processor is configured to receive an input instruction based on frequency settings and send the input instruction to the electronic transformer, and the controller is configured to control an output power of the electronic transformer according to the input instruction; or wherein the upper processor is configured to receive the input instruction based on the frequency settings and control the output power of the electronic transformer according to the input instruction.

15. The microwave cooking appliance according to claim 13, wherein the controller comprises a drive circuit connected to the switch and the processor, respectively, and configured to control the switching frequency of the switch according to the control signal output by the processor.

* * * * *